US012764776B2

(12) United States Patent
Ke et al.

(10) Patent No.: US 12,764,776 B2
(45) Date of Patent: Oct. 13, 2026

(54) DATA CONTROL METHOD AND APPARATUS, COMMUNICATION DEVICE, AND READABLE STORAGE MEDIUM

(71) Applicant: VIVO MOBILE COMMUNICATION CO., LTD., Dongguan (CN)

(72) Inventors: Xiaowan Ke, Dongguan (CN); Xiaobo Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 335 days.

(21) Appl. No.: 18/534,554

(22) Filed: Dec. 8, 2023

(65) Prior Publication Data

US 2024/0107573 A1 Mar. 28, 2024

Related U.S. Application Data

(63) Continuation of application No. PCT/CN2022/097328, filed on Jun. 7, 2022.

(30) Foreign Application Priority Data

Jun. 10, 2021 (CN) ......................... 202110648652.6

(51) Int. Cl.
*H04W 72/543* (2023.01)

(52) U.S. Cl.
CPC ................................. *H04W 72/543* (2023.01)

(58) Field of Classification Search
CPC ..... H04W 72/543; H04W 76/12; H04W 8/08; H04W 28/24; H04W 28/12; H04L 47/32
USPC .......................................................... 370/329
See application file for complete search history.

(56) References Cited

U.S. PATENT DOCUMENTS

| | | | | |
|---|---|---|---|---|
| 8,351,327 B1 * | 1/2013 | Binns | H04L 67/148 370/229 |
| 2002/0036986 A1 * | 3/2002 | Haarsten | H04L 1/18 709/225 |
| 2005/0058147 A1 * | 3/2005 | Regnier | H04L 47/245 370/412 |
| 2009/0300207 A1 * | 12/2009 | Giaretta | H04W 4/24 713/150 |

(Continued)

FOREIGN PATENT DOCUMENTS

| | | |
|---|---|---|
| CN | 111194085 A | 5/2020 |
| CN | 111726882 A | 9/2020 |
| CN | 112350979 A | 2/2021 |

OTHER PUBLICATIONS

International Search Report issued in corresponding International Application No. PCT/CN2022/097328, mailed Aug. 26, 2022, 4 pages.

*Primary Examiner* — Rownak Islam
(74) *Attorney, Agent, or Firm* — IPX PLLC

(57) ABSTRACT

This application discloses a data control method and apparatus, a communication device, and a readable storage medium. The data control method includes: obtaining, by a first communication device, first information or index information used to indicate a value of the first information, and performing a QoS control operation according to the first information or the index information used to indicate the value of the first information, where the first information includes at least one of the following: data description information of a data packet; data tunnel association information; data set association information; or first operation indication information.

20 Claims, 7 Drawing Sheets

(56) References Cited

U.S. PATENT DOCUMENTS

| | | | | |
|---|---|---|---|---|
| 2014/0294018 | A1* | 10/2014 | Sung | H04L 63/162 370/474 |
| 2019/0075308 | A1 | 3/2019 | Wei et al. | |
| 2019/0238460 | A1* | 8/2019 | Vasudevan | H04L 45/306 |
| 2021/0160333 | A1 | 5/2021 | Wang | |
| 2021/0367871 | A1* | 11/2021 | Musa | H04L 43/04 |
| 2023/0116578 | A1* | 4/2023 | Fan | H04W 28/0268 370/310 |

* cited by examiner

DATA CONTROL METHOD AND APPARATUS, COMMUNICATION DEVICE, AND READABLE STORAGE MEDIUM

CROSS-REFERENCE TO RELATED APPLICATIONS

This application is a continuation of International Application No. PCT/CN2022/097328, filed Jun. 7, 2022, which claims priority to Chinese Patent Application No. 202110648652.6, filed Jun. 10, 2021. The entire contents of each of the above-referenced applications are expressly incorporated herein by reference.

TECHNICAL FIELD

This application relates to the field of communication technologies, and specifically relates to a data control method and apparatus, a communication device, and a readable storage medium.

BACKGROUND

When communication devices in some communication systems perform data packet scheduling, a direct operation is performed based on a received data packet. For example, a data packet of an Extended Reality (XR) service is scheduled to be sent. It can be learned that at present, there is a problem that operation performance of a data packet is relatively poor.

SUMMARY

Embodiments of this application provide a data control method and apparatus, a communication device, and a readable storage medium.

According to a first aspect, a data control method is provided, including:

obtaining, by a first communication device, first information and/or index information used to indicate a value of the first information; and performing, by the first communication device, a quality of service QoS control operation according to the first information and/or the index information used to indicate the value of the first information, where the first information includes at least one of the following:

data description information of a data packet;

data tunnel association information;

data set association information; or first operation indication information.

According to a second aspect, a data control method is provided, including:

receiving, by a second communication device, a data packet; and performing, by the second communication device, a second operation on the received data packet, where the second operation includes at least one of the following:

performing a data tunnel mapping operation;

identifying whether the data packet is data that conforms to data characteristic information;

adding, to a first header of a data packet that conforms to the data characteristic information, target information that conforms to the data characteristic information;

adding target information corresponding to a default data set to a first header of a data packet that does not conform to the data characteristic information; or adding target information corresponding to a default data set to a first header of a data packet that does not conform to data characteristic information in any non-default data set mapping rule, where the target information includes at least one of the following: first information or index information used to indicate a value of the first information; and the first information includes at least one of the following:

data description information of a data packet;

data tunnel association information;

data set association information; or first operation indication information.

According to a third aspect, a data control method is provided, including:

performing, by a third communication device, a third operation, where the third operation includes at least one of the following:

a data tunnel mapping operation;

determining a first operation rule;

determining an effective time of the first operation rule;

determining first information and/or index information used to indicate a value of the first information;

sending the first operation rule, or sending the first operation rule and the effective time of the first operation rule; or sending the first information and/or the index information used to indicate the value of the first information, where the first information includes at least one of the following:

data description information of a data packet;

data tunnel association information;

data set association information; or first operation indication information; and the first operation rule includes at least one of the following:

data characteristic information;

target information corresponding to the data characteristic information;

operation information used to instruct to add the target information to a first header of a data packet; or a data tunnel mapping rule, where the target information includes at least one of the following: the first information or the index information used to indicate the value of the first information.

According to a fourth aspect, a data control method is provided, including:

performing, by a fourth communication device, a fourth operation, where the fourth operation includes at least one of the following:

performing a data tunnel mapping operation;

determining first policy information;

determining an effective time of the first policy information; or sending the first policy information, or sending the first policy information and information about the effective time of the first policy information, where the first policy information includes at least one of the following:

data characteristic information;

target information corresponding to the data characteristic information;

first information corresponding to the data characteristic information;

operation information used to instruct to add the target information to a first header of a data packet; or a data tunnel mapping rule, where the target information includes at least one of the following: the first information or index information used to indicate a value of the first information; and the first information includes at least one of the following:

data description information of a data packet;

data tunnel association information;

data set association information; or first operation indication information.

According to a fifth aspect, a data control method is provided, including:

sending, by a fifth communication device, fifth information, where the fifth information includes at least one of the following:

data characteristic information of first service data;

information about a time at which a first service occurs; or first information corresponding to the first service data, where the first information includes at least one of the following:

data description information of a data packet;

data tunnel association information;

data set association information; or first operation indication information.

According to a sixth aspect, a data control apparatus is provided, including:

an obtaining module, configured to obtain first information and/or index information used to indicate a value of the first information; and a first execution module, configured to perform a quality of service QoS control operation according to the first information and/or the index information used to indicate the value of the first information, where the first information includes at least one of the following:

data description information of a data packet;

data tunnel association information;

data set association information; or first operation indication information.

According to a seventh aspect, a data control apparatus is provided, including:

a receiving module, configured to receive a data packet; and a second execution module, configured to perform a second operation on the received data packet, where the second operation includes at least one of the following:

performing a data tunnel mapping operation;

identifying whether the data packet is data that conforms to data characteristic information;

adding, to a first header of a data packet that conforms to the data characteristic information, target information that conforms to the data characteristic information;

adding target information corresponding to a default data set to a first header of a data packet that does not conform to the data characteristic information, or adding target information corresponding to a default data set to a first header of data that does not conform to any non-default data set mapping rule; or adding target information corresponding to a default data set to a first header of a data packet that does not conform to data characteristic information in any non-default data set mapping rule, where the target information includes at least one of the following: first information or index information used to indicate a value of the first information; and the first information includes at least one of the following:

data description information of a data packet;

data tunnel association information;

data set association information; or first operation indication information.

According to an eighth aspect, a data control apparatus is provided, including:

a third execution module, configured to perform a third operation, where the third operation includes at least one of the following:

a data tunnel mapping operation;

determining a first operation rule;

determining an effective time of the first operation rule;

determining first information and/or index information used to indicate a value of the first information;

sending the first operation rule, or sending the first operation rule and the effective time of the first operation rule; or sending the first information and/or the index information used to indicate the value of the first information, where the first information includes at least one of the following:

data description information of a data packet;

data tunnel association information;

data set association information; or first operation indication information; and the first operation rule includes at least one of the following:

data characteristic information;

target information corresponding to the data characteristic information;

operation information used to instruct to add the target information to a first header of a data packet; or a data tunnel mapping rule, where the target information includes at least one of the following: the first information or the index information used to indicate the value of the first information.

According to a ninth aspect, a data control apparatus is provided, including:

a fourth execution module, configured to perform a fourth operation, where the fourth operation includes at least one of the following:

performing a data tunnel mapping operation;

determining first policy information;

determining an effective time of the first policy information; or sending the first policy information, or sending the first policy information and information about the effective time of the first policy information, where the first policy information includes at least one of the following:

data characteristic information;

target information corresponding to the data characteristic information;

first information corresponding to the data characteristic information;

operation information used to instruct to add the target information to a first header of a data packet; or a data tunnel mapping rule, where the target information includes at least one of the following: the first information or index information used to indicate a value of the first information; and the first information includes at least one of the following:

data description information of a data packet;

data tunnel association information;

data set association information; or first operation indication information.

According to a tenth aspect, a data control apparatus is provided, including:

a sending module, configured to send fifth information, where the fifth information includes at least one of the following:
data characteristic information of first service data;
information about a time at which a first service occurs; or
first information corresponding to the first service data, where
the first information includes at least one of the following:
data description information of a data packet;
data tunnel association information;
data set association information; or
first operation indication information.

According to an eleventh aspect, a communication device is provided. The communication device includes a processor, a memory, and a program or an instruction that is stored in the memory and that can be run on the processor, and the program or the instruction is executed by the processor to implement the steps of the method in the first aspect, or the steps of the method in the second aspect, or the steps of the method in the third aspect, or the steps of the method in the fourth aspect, or the steps of the method in the fifth aspect.

According to a twelfth aspect, a readable storage medium is provided. The readable storage medium stores a program or an instruction, and the program or the instruction is executed by a processor to implement the steps of the method in the first aspect, or the steps of the method in the second aspect, or the steps of the method in the third aspect, or the steps of the method in the fourth aspect, or the steps of the method in the fifth aspect.

According to a thirteenth aspect, a chip is provided. The chip includes a processor and a communication interface, the communication interface is coupled to the processor, and the processor is configured to run a program or an instruction to implement the steps of the method in the first aspect, or the steps of the method in the second aspect, or the steps of the method in the third aspect, or the steps of the method in the fourth aspect, or the steps of the method in the fifth aspect.

According to a fourteenth aspect, a computer program/program product is provided. The computer program/program product is stored in a non-transient storage medium, and the program/program product is executed by at least one processor to implement the steps of the method in the first aspect, or the steps of the method in the second aspect, or the steps of the method in the third aspect, or the steps of the method in the fourth aspect, or the steps of the method in the fifth aspect. It is not difficult to understand that operation performance of a data packet can be improved through the solution in this embodiment.

BRIEF DESCRIPTION OF DRAWINGS

It becomes clear for persons skilled in the art to learn various other advantages and benefits by reading detailed description of the following implementations. Accompanying drawings are merely used for showing the implementations, but not considered as a limitation on this application. In all accompanying drawings, a same reference symbol is used to indicate a same part. In the accompanying drawings.

DETAILED DESCRIPTION

Figure 1:
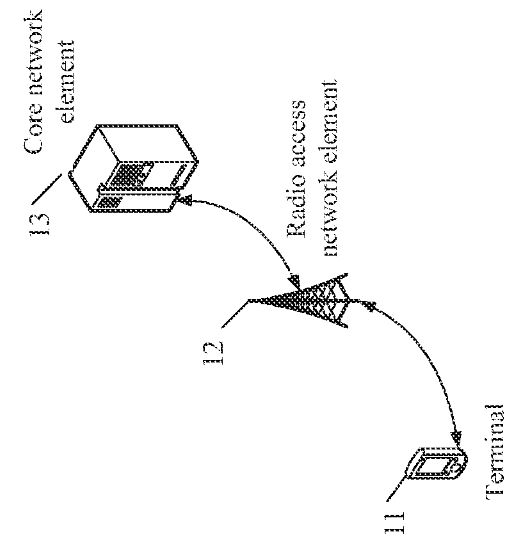
FIG. 1 is a block diagram of a wireless communication system to which embodiments of this application can be applied.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The term “include” and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, “and/or” is used to indicate at least one of connected objects. For example, A and/or B represents the following three cases: Only A is included, only B is included, and both A and B exist.

In the embodiments of this application, the word such as “example” or “for example” is used to represent giving an example, an illustration, or a description. Any embodiment or design scheme described as “an example of” or “for example” in the embodiments of this application should not be explained as being more preferred or having more advantages than another embodiment or design scheme. Exactly, use of the term “example” or “for example” is intended to present a concept in a specific manner.

In the specification and claims of this application, the terms “first”, “second”, and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by “first” and “second” are usually of a same type, and the number of objects is not limited. For example, there may be one or more first objects. In addition, in the specification and the claims, “and/or” represents at least one of connected objects, and a character “/” generally represents an “or” relationship between associated objects. In some implementations, objects indicated by “first” and “second” may be the same or different.

In an embodiment of this application, can may represent at least one of the following: allowing, supporting, tending to, and preferentially having a capability, and cannot may represent at least one of the following: not allowing, not supporting, not tending to, and not having a capability.

In the embodiments of this application, obtaining may be understood as generating, obtaining from a configuration, receiving, receiving through a request, obtaining through self-learning, deriving from unreceived information, or obtaining after processing based on received information. This may be determined based on an actual requirement, and is not limited in the embodiments of this application.

In the embodiments of this application, sending may include broadcasting, broadcasting in a system message, returning after responding to a request, sending by using dedicated signaling, and the like.

In the embodiments of this application, the network includes a mobile communication network.

The embodiments of this application are described below with reference to the accompanying drawings. An information transmission method and apparatus, a communication device, and a readable storage medium provided in the embodiments of this application are not limited to a Long Term Evolution (LTE)/LTE-Advanced (LTE-A) system, and can also be used in other wireless communication systems such as Code Division Multiple Access (CDMA).

Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a New Radio (NR) system for example purposes, and NR terms are used in most of the following descriptions, although these technologies can also be applied to an application other than an NR system application, for example, a 6th generation (6G) communication system.

The embodiments of this application are described below with reference to the accompanying drawings. A data control method and apparatus, a communication device, and a storage medium provided in the embodiments of this application may be applied to the network system shown in FIG. 1. As shown in FIG. 1, the network system includes a terminal 11, a radio access network element 12, and a core network element 13.

In an embodiment of this application, a communication device may include at least one of the following: a communication network element device or a terminal.

In an embodiment of this application, a communication network element may include at least one of the following: a core network element or a radio access network element.

In the embodiments of this application, the core network element 13 may be referred to as at least one of the following: a core network device, a core network node, a core network function, or a core network unit. The core network element may include but is not limited to at least one of the following: a Mobility Management Entity (MME), an Access Management Function (AMF), a Session Management Function (SMF), a User Plane Function (UPF), a serving gateway (serving GW, SGW), a PDN gateway, a Policy Control Function (PCF), a Policy and Charging Rules Function (PCRF), a Serving GPRS Support Node (SGSN), a Gateway GPRS Support Node (GGSN), a Unified Data Management (UDM), a Unified Data Repository (UDR), a Home Subscriber Server (HSS), an Application Function (AF), or a Centralized network configuration (CNC).

In the embodiments of this application, the radio access network element 12 may be referred to as at least one of the following: a radio access network device, a radio access network node, a radio access network function, or a radio access network unit. The radio access network element may include but is not limited to at least one of the following: a radio access network device, a radio access network node, a radio access network function, a radio access network unit, a Third Generation Partnership Project (3GPP) radio access network, a non-3GPP radio access network, a Centralized Unit (CU), a Distributed Unit (DU), a base station, an evolved NodeB (eNB), a 5G base station (gNB), a Radio Network Controller (RNC), a base station (NodeB), a Non-3GPP Inter Working Function (N3IWF), an Access Controller (AC) node, an Access Point (AP) device, a Wireless Local Area Networks (WLAN) node, or an N3IWF.

The base station may be a base transceiver station (BTS) in a Global System for Mobile Communication (GSM) or Code Division Multiple Access (CDMA), or may be a NodeB in Wideband Code Division Multiple Access (WCDMA), or may be an evolved NodeB (eNB or e-NodeB, evolutional NodeB) and a 5G base station (gNB) in LTE. This is not limited in the embodiments of this application.

In the embodiments of this application, UE is a terminal. The terminal 11 may include a relay that supports a function of the terminal and/or a terminal that supports a function of the relay. The terminal may also be referred to as a terminal device to User Equipment (UE). The terminal may be a terminal side device such as a mobile phone, a tablet personal computer, a laptop computer, a personal digital assistant (PDA), a mobile internet device (MID), an augmented reality (AR)/virtual reality (VR) device, a robot, a wearable device, or an in-vehicle device. It should be noted that a specific type of the terminal is not limited in the embodiments of this application.

In addition, the embodiments of this application may be applied to communication systems such as 4G, 5G, and 6G.

In the embodiments of this application, the following problems need to be resolved:

Scene 1: Data of a video stream in XR may be classified into an intra-frame (intra picture, I), a forward predictive (predictive, P) frame, and a bi-directional interpolated prediction (bi-directional interpolated prediction, B) frame. The I frame is also referred to as an independent decoding frame. A frame between I frames is a P frame or a B frame. The I frame associated with the P frame or the B frame is an I frame that is the closest to the P frame or the B frame and that is forward in a time line. Decoding cannot be performed without the I frame, but the I frame can be used for independent decryption in the absence of a non-I frame. Therefore, the I frame is more important than the non-I frame. QoS requirements of the I frame and the non-I frame may be different. For example, a priority of the I frame is higher than that of the non-I frame, and a transmission rate of the non-I frame may be higher than that of the I frame.

Therefore, in a scene in which data of one XR service is mapped to a plurality of QoS flows, the following problem needs to be resolved.

Problem 1: When mapping to a plurality of QoS flows, for example, a first QoS flow that is used to carry an I frame, and a second QoS flow that is used to carry a non-I frame, in a case that the I frame fails to be sent, it will be meaningless to continue to send the non-I frame associated with the I frame. However, in a case that the I frame and the non-I frame are mapped to different QoS flows, it is not clear which I frame is associated with which non-I frame.

Problem 2: In a case that a communication network receives an I frame and a non-I frame, if intermediate several I frames are lost, the non-I frame associated with the lost I frame cannot be identified.

In one solution, a non-I-frame data packet carries a sequence number of the associated I frame. In this way, through the sequence number of the associated I frame carried in the non-I-frame data packet, whether the I frame associated with the non-I frame is lost can be identified. Therefore, in a case that the associated I frame is lost, the non-I frame may be discarded or not sent, thereby avoiding a case that the non-I frame associated with the lost I frame cannot be identified.

In another solution, first data carries a timestamp, second data carries a timestamp, and the second data at intervals of two pieces of first data is associated with the first data. In addition, there is a maximum time interval between the two pieces of first data, and if the maximum time interval is exceeded, it indicates that the first data is lost. For example, a data packet of an I frame (hereinafter referred to as an I-frame data packet for short) carries a timestamp, a data packet of a non-I frame (hereinafter referred to as a non-I-frame data packet) carries a timestamp, the non-I-frame data packet at intervals of two I-frame data packets is associated with the I-frame data packet, and there is a maximum time interval between the two I-frame data packets. In this case, if an interval between the two I-frame packets exceeds the maximum time interval, it indicates that the I frame is lost. Therefore, in a case that the I frame is lost, the associated non-I frame may be discarded or not sent, thereby avoiding a case that the non-I frame associated with the lost I frame cannot be identified.

Scene 2: There is data of a left eye and data of a right eye in an XR service, and the data of the left eye and the data of the right eye need to be scheduled together. Importance levels of the data of the left eye and the data of the right eye are equal. However, timestamps are currently added to the data of the left eye and the data of the right eye, but may only be quasi-synchronous, that is, there is a specified offset.

Therefore, in a scene in which data of one XR service is mapped to a plurality of QoS flows, the following problem needs to be resolved:

Problem 3: When mapping to a plurality of QoS flows, how to keep data of a left eye and data of a right eye sent simultaneously. For example, a left-eye frame data packet carries a timestamp, and a right-eye frame data packet carries a timestamp. In this case, a coordinated scheduling operation may be performed on the left-eye frame data packet and the right-eye frame data packet that are mapped to different QoS flows by using the carried timestamps, to ensure that the data of the left eye and the data of the right eye are simultaneously sent.

Scene 3: In holographic communication, a plurality of QoS flows also have a synchronization requirement. For example, in this case, importance level labels of the plurality of QoS flows are equal. In addition, the plurality of QoS flows may belong to different terminals, and the different terminals may be served by a same RAN or by a plurality of RANs.

An operation behavior may be as follow: Synchronous scheduling is performed according to a timestamp, that is, synchronous scheduling needs to be performed on data packets in a same timestamp or a timestamp viscous interval. For example, data packets mapped to a plurality of QoS flows carry a same timestamp. In this case, synchronous scheduling can be performed on the data packets of the plurality of QOS flows by using the same timestamp. In some embodiments, data packets mapped to a plurality of QoS flows carry different timestamps, but the different timestamps are in a same timestamp viscous interval. In this case, synchronous scheduling can be performed on the data packets of the plurality of QoS flows. The following describes the communication terms in the embodiments of this application.

In an embodiment of the present application, data and a data packet represent a same meaning and may be interchanged.

In an embodiment of the present application, description information of a data tunnel includes information used to identify the data tunnel. When the data tunnel is a QoS flow, the description information of the data tunnel may be at least one of the following: a QoS flow identifier or a 5QI.

In an embodiment of this application, a data tunnel may include but is not limited to one of the following: a PDU session, a PDN connection, a QoS flow, a bearer, and an Internet Protocol Security (IPsec) channel, where the bearer may be an Evolved Radio Access Bearer (E-RAB), a Radio Access Bearer (RAB), a Data Radio Bearer (DRB), a signaling radio bearers (SRB), or the like.

In an embodiment of this application, a first header is a header of a first protocol.

In an embodiment of this application, the first protocol is an interface protocol between a first communication device and a second communication device.

In an implementation, in a case that the first communication device is a RAN network element and the second communication device is a gateway, the interface protocol between the first communication device and the second communication device may be an interface protocol between the RAN network element and the gateway, for example, an interface protocol of an NG interface user plane, namely, a GTP-U. The header of the first protocol may be a GTP-U container. A full name of GTP is a GPRS Tunneling Protocol (GTP).

In an implementation, in a case that the first communication device is a RAN network element and the second communication device is a terminal, the interface protocol between the first communication device and the second communication device may be an interface protocol between the RAN network element and the terminal, for example, Radio Resource Control (RRC).

In an embodiment of this application, a data set includes a data frame. In another embodiment of this application, a data set includes one or more data packets. Data frames correspond to data sets one by one or a plurality of data frames are mapped to one data set.

In an implementation, the data frame includes a data frame of a video service. For example, a type of the data frame is one of the following: an I frame, a P frame, a B frame, a left-eye frame, or a right-eye frame.

In an embodiment of this application, type information of a data packet, type information of data, or type information of a data set includes at least one of the following: an I frame, a non-I frame, a left-eye frame, a right-eye frame, a first type, or another type dependent on the first type. In an implementation, the first type may be referred to as a key type.

In an embodiment of this application, a data frame may include one or more data packets having same content or one or more consecutive data packets, for example, an I frame, a non-I frame, a P frame, a B frame, a left-eye frame, and a right-eye frame.

In an implementation, the non-I frame includes at least one of the following: a P frame or a B frame.

In an embodiment of this application, description information of a first data set group includes information used to identify the data set group and description information of one or more data sets.

In an embodiment of this application, an importance level may include one or more importance levels. Importance level information includes at least one of the following: being equal, and information used to identify the importance level.

In an implementation, the information used to identify the importance level includes an importance level sequence number (for example, an $N^{th}$ importance level). In an implementation, a larger importance level sequence number indicates a higher importance level. In another implementation, a smaller importance level sequence number indicates a lower importance level.

In an implementation, the importance level is referred to as a priority level.

In an implementation of the present application, a data set that is associated with a first data set includes a data set dependent on the first data set.

In an implementation of the present application, a data set associated with a second data set includes a data set on which the second data set is dependent.

In an implementation of the present application, data associated with first data includes at least one of the following: data whose data set is the same as a data set to which the first data belongs and that is dependent on the first data.

In an implementation of the present application, data associated with second data includes at least one of the following: data whose data set is the same as a data set to which the second data belongs and that is depended by the second data.

In an implementation of the present application, a data tunnel having an association relationship with a first data tunnel includes: a data tunnel that is dependent on the first data tunnel, for example, a second data tunnel. Data or a data set in the second data tunnel is dependent on data or a data set in the first data tunnel.

In an implementation of the present application, a data tunnel having an association relationship with a second data tunnel includes: a data tunnel on which the second data tunnel is dependent, for example, a first data tunnel. Data or a data set in the first data tunnel is depended by data or a data set in the second data tunnel.

In an implementation of this application, a data set to which a data packet belongs is a data set to which data characteristic information of the data packet is mapped.

In an implementation of this application, target information of the data characteristic information includes first information corresponding to the data set to which the data characteristic information is mapped. After the target information that conforms to the data characteristic information is added to a first header of a data packet that conforms to the data characteristic information, a data set to which the data packet belongs is the data set to which the data characteristic information is mapped.

In an implementation of this application, after target information corresponding to a default data set is added to a first header of a data packet that does not conform to the data characteristic information, a data set to which the data packet that does not conform to the data characteristic information belongs is the default data set. When there are a plurality of data sets in one data tunnel, the default data set has a lowest importance level.

In an implementation of this application, after target information corresponding to a default data set is added to a first header of a data packet that does not conform to data characteristic information in any non-default data set mapping rule, a data set to which the data packet belongs is the default data set.

In an embodiment of this application, the timestamp includes at least one of the following: a decoding timestamp, a display timestamp, or a sending timestamp.

In an embodiment of the present application, a timestamp difference interval range includes a time value, representing a positive or negative time difference. For example, the timestamp difference interval range is 5 ms. A timestamp difference less than and/or equal to positive or negative 5 ms falls within a timestamp difference interval.

In an embodiment of this application, the data characteristic information includes at least one of the following: description information of a service, a data characteristic description, a data association relationship, second header information corresponding to the data characteristic information, protocol information to which the data characteristic information belongs, or protocol layer information to which the data characteristic information belongs.

(1) In an embodiment of this application, the service is a service flow to which data belongs. In an implementation, description information of the service includes at least one of the following: service type information, a Fully Qualified Domain Name (FQDN), a source IP address, a destination IP address, a source port, a target port, a protocol number, a Media Access Control (MAC) address, a destination MAC address, an application (APP) identifier of the service, an operating system (OS) identifier, a packet detection rule (PDR), or a data network name (DNN).

(2) In an embodiment of this application, the data characteristic description includes at least one of the following: type information of data or timestamp information. The type information of the data is, for example, type information of a data frame. The type information of the data frame includes at least one of the following: a type of the data frame is, for example, one of the following: an I frame, a P frame, a B frame, a left-eye frame, or a right-eye frame.

(3) In an implementation, second header information is a header of a second protocol of a data packet. When the second protocol is a Moving Picture Experts Group (MPEG) protocol, the second header information may be a Network Abstract Layer (NAL) of the MPEG protocol.

In an implementation, whether the data is the first data may be determined by determining data characteristic information in the second header information of the data packet.

In an implementation, the data characteristic information may be obtained from the second header information. For example, an I frame may be obtained by reading an NAL header of the MPEG protocol.

(4) In an embodiment of this application, the protocol information includes at least one of the following: a name of the protocol, a version number of the protocol, or information used to identify the protocol. In an implementation, the protocol includes an MPEG protocol (for example, one of the following: H.264 or H.265).

(5) In an embodiment of this application, the protocol layer information to which the data characteristic information belongs may be a quantity of layers from a start of an outermost layer protocol of data to a protocol to which the data characteristic information belongs. For example, if a data packet structure corresponding to an I frame is an IP (TCP (MPEG)), the protocol layer information to which the data characteristic information belongs is a third layer, the protocol information to which the data characteristic information belongs is an MPEG protocol, and the header information corresponding to the data characteristic information is an 1 frame. The data packet may be identified as an I frame according to the protocol layer information to which the data characteristic information belongs.

(6) In an embodiment of this application, association relationship information of data includes data description information of data B. The data B is data associated with data A indicated by the data characteristic description.

In a case that the data A is a data frame, the association relationship information of the data includes reference frame information of the data A. For example, a reference frame of a P frame is an I frame.

In an embodiment of this application, an association relationship includes at least one of the following: a dependent relationship or a depended relationship. For example, there is association relationship between a left-eye frame and a right-eye frame. There is a dependent relationship and a depended relationship between an I frame and a P frame. That is, the I frame is depended by the P frame, and the P frame is dependent on the I frame.

When the data A is dependent on the data B, it may be indicated that the data A cannot be decoded independently, and can be decoded only based on the data B.

In an implementation of the present application, the coordinated scheduling includes: performing coordinated scheduling and/or QoS guarantee on data sets and/or data packets having an association relationship, for example, at least one of the following: continuous sending, simultaneous sending, sending together, or sending in a same time interval.

In an implementation of the present application, index information used to indicate description information of the data set means that there is a mapping relationship between the index information and a value of the description information of the data set; and the value of the description information of the data set may be learned according to the index information.

In an implementation of the present application, information about an effective time includes information about an effective time period.

In an embodiment of this application, information obtained by a terminal from control plane signaling of a communication network includes: information obtained by a communication module of the terminal from the control plane signaling of the communication network. In an embodiment of this application, the communication module may include a chip configured to communicate with the network. The control plane signaling includes at least one of the following: Network Attached Storage (NAS) signaling or AS signaling (also referred to as RRC signaling).

In another implementation, information obtained by a terminal from control plane signaling of a communication network may be information generated by the communication network. The information needs to be sent to an application server by using an application client through an application layer. It is not difficult to understand that, the information sent through the application layer may be packaged as user plane data in the communication network, thereby reducing impact on a control plane interface.

In an implementation of this application, the data set may also be referred to as one of the following: a data segment, a data frame, or application data.

In an implementation, a data set mapping rule in the data tunnel mapping rule is a data set mapping rule in the data tunnel.

In an implementation of this application, the data set mapping rule includes at least one of the following: data characteristic information, description information of a data set, information used to identify the data set mapping rule, or a priority of the data set mapping rule.

In an implementation, when a value of the data characteristic information is any data or is not defined, the data set is a default data set, and the data set mapping rule is a default data set mapping rule.

In an implementation, the data characteristic information indicates a data set indicated by description information of the data set to which a data packet that conforms to the data characteristic information is mapped.

In an implementation, the data set is a default data set that is used to map data that does not conform to the data characteristic information. When there are a plurality of data sets in one data tunnel, the default data set has a lowest importance level.

In an implementation, the data characteristic information indicates a data set indicated by description information of the data set to which a data packet that conforms to the data characteristic information is mapped.

In an implementation, the data set is a default data set that is used to map data that does not conform to the data characteristic information. When there are a plurality of data sets in one data tunnel, the default data set has a lowest importance level.

The performing a data set mapping operation includes at least one of the following:

- mapping data that meets at least one of the following to different data sets: data in different data frames, data in different types of data frames, data of data frames having different importance levels, different types of data, data having different importance levels, different types of data in a same data frame, and data having different importance levels data in a same data frame;
- mapping data that meets at least one of the following to a same data set: data in a same data frame, data in a same type of data frame, data in data frames having a same importance level, a same type of data, or data having a same importance level;
- mapping an importance level of a data frame or an importance level of data to an importance level of a data frame;
- in a case that a data frame A is dependent on a data frame B and the data frame A and the data frame B are mapped to different data sets, setting a priority of a data set of the data frame A to be higher than that of a data set of the data frame B; or
- in a case that data A is dependent on data B and the data A and the data B are mapped to different data sets, setting a priority of a data set of the data A to be higher than that of a data set of the data B, where the data A and the data B are in a same data frame.

In an embodiment of this application, information obtained by a terminal from control plane signaling of ae communication network includes: information obtained by a communication module of the terminal from the control plane signaling of the communication network. In an embodiment of this application, the communication module may include a chip configured to communicate with the network. The control plane signaling includes at least one of the following: NAS signaling or AS signaling (also referred to as RRC signaling).

In another implementation, information obtained by a terminal from control plane signaling of a communication network may be information generated by the communication network. The information needs to be sent to an application server by using an application client through an application layer. It is not difficult to understand that, the information sent through the application layer may be packaged as user plane data in the communication network, thereby reducing impact on a control plane interface.

In an embodiment of this application, first data includes data of an I frame, and second data includes a data packet of a non-I frame, for example, a data packet of a P frame and/or a data packet of a B frame.

In an embodiment of this application, description information of a first data tunnel includes at least one of the following: an I frame, important, equal, and an importance level, and description information of a second data tunnel includes at least one of the following: a non-I frame, minor, equal, or an importance level. For example, when it is determined that the I frame and the non-I frame are mapped to different data tunnels, a priority of the first data tunnel may be set to be higher than that of the second data tunnel.

In an embodiment of this application, when there are N associated data tunnels, the importance level may have N values, for example, a first important level, a second important level, and a third important level, and the first important level>the second important level>the third important level.

In an embodiment of this application, a value of the importance level may include at least one of the following: being equal, a first important level, a second important level, . . . , or an $N^{th}$ important level.

In an embodiment of this application, an importance level of a corresponding data packet may be mapped according to an I frame and a non-I frame, and/or the I frame is mapped to the first important level, and/or the non-I frame is mapped to the second important level, and/or an importance level of a corresponding data packet is mapped according to a left eye and a right eye, and/or important levels of the left eye and the right eye are mapped to being equal.

In an embodiment of this application, a data tunnel group includes one or more data tunnels (for example, QoS flows), and there is an association relationship between data tunnels that belong to a same data tunnel group. Information about the data tunnel group includes a group identifier of the data tunnel group and an identifier of a data tunnel included in the data tunnel group.

With reference to the accompanying drawings, the following describes in detail a data control method provided in the embodiments of this application by using some embodiments and application scenes thereof.

Figure 2:
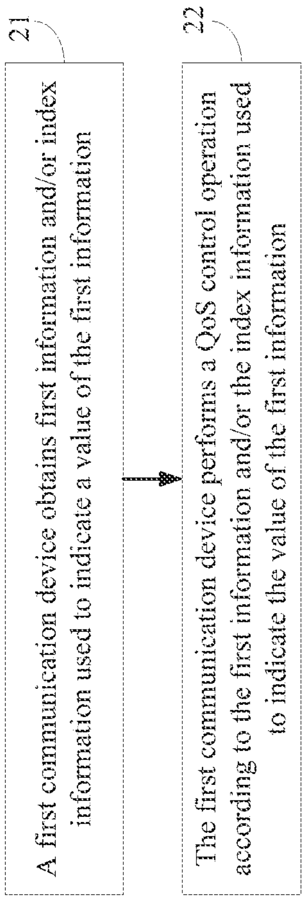
FIG. 2 is a flowchart of a data control method according to an embodiment of this application.

Referring to FIG. 2, FIG. 2 is a flowchart of a data control method according to an embodiment of this application. The method is applied to a first communication device. The first communication device includes but is not limited to a RAN network element. As shown in FIG. 2, the method includes the following step:

Step 21: The first communication device obtains first information and/or index information used to indicate a value of the first information.

In some embodiments, the first information may include at least one of the following:

data description information of a data packet;
data tunnel association information;
data set association information; or
first operation indication information.

Step 22: The first communication device performs a QoS control operation according to the first information and/or the index information used to indicate the value of the first information.

In an implementation, the first communication device may receive the foregoing first information and/or the index information used to indicate the value of the first information from a core network element (for example, a UPF) or a terminal.

In an implementation, the index information used to indicate the value of the first information may be index information of the value of the first information, and the first information may be determined by using the index information.

In another implementation, the first information may be determined according to the index information used to indicate the value of the first information.

In some embodiments, the QoS control operation includes at least one of the following:

discarding or not sending a data packet;
performing a coordinated scheduling operation on data packets;
performing a reordering operation on a data packet; or
sending a data packet according to an importance level.

It is not difficult to understand that: (1) According to the first information and/or the index information used to indicate the value of the first information, the data packet is discarded or is not sent, so that a case that a data packet associated with a lost data packet cannot be identified can be avoided, thereby improving data operation performance. For example, according to the data set association information and/or the data tunnel association information, if an I-frame data packet in a data set is lost or fails to be sent, an associated non-I-frame data packet may be discarded or not sent, so that a case that the non-I-frame associated with the lost I-frame cannot be identified can be avoided.

(2) According to the first information and/or the index information used to indicate the value of the first information, the coordinated scheduling operation is performed on the data packets, so that synchronous scheduling can be performed on data packets that are mapped to different data tunnels, thereby improving data operation performance. For example, according to the data description information of the data packet and/or the data tunnel association information, synchronous scheduling can be performed on data that is mapped to different data tunnels and that has a synchronization requirement, such as a left-eye frame data packet and a right-eye frame data packet, to ensure that data of a left eye and a right eye are simultaneously sent.

(3) According to the first information and/or the index information used to indicate the value of the first information, the reordering operation is performed on the data packet, so that associated data can be sent in sequence, a case that data cannot be identified is reduced, and data that has a synchronization requirement is scheduled synchronously. For example, for a left-eye frame data packet and a right-eye frame data packet that are mapped to different data tunnels, the left-eye frame data packet and the right-eye frame data packet may be simultaneously scheduled through the reordering operation.

(4) According to the first information and/or the index information used to indicate the value of the first information, the data packet is sent according to the importance level, so that it can be ensured that data with a high importance level is sent first, and data with a same importance level is scheduled synchronously.

In some embodiments, the data description information of the data packet may include at least one of the following:

description information of a data set to which the data packet belongs and/or index information used to indicate the description information of the data set;
information used to identify the data packet;
type information of the data packet;

an importance level of the data packet; or timestamp information of the data packet.

In some embodiments, the description information of the data set may include at least one of the following:

information used to identify the data set;

importance level information of the data set;

type information of the data set;

label information of the data set; or a sequence number of the data set.

In an implementation, the data set includes one or more data packets. When sequence numbers of data sets of two data packets are the same, importance levels of the two data packets may be different or the same.

In an implementation, data set types of two data packets are the same, but sequence numbers of data sets to which the data packets belong may be different. For example, for a frame sequence IPBIPPI, a first frame, a fourth frame and a seventh frame correspond to data sets of an I frame type, but sequence numbers of the data sets corresponding to these frames may be different, for example, 1, 2, and 3.

In an implementation, one data set may be used to map data of one or more data frames.

In an implementation, one data frame may include one or more data packets.

In an implementation, data of different importance levels in one data set may be mapped to different data tunnels (for example, QoS flows).

In another implementation, different data sets may be mapped to different data tunnels (for example, QoS flows).

In some embodiments, the information used to identify the data set includes at least one of the following:

the index information used to indicate the description information of the data set;

the importance level information of the data set;

the type information of the data set;

the label information of the data set; or the sequence number of the data set.

In an implementation, the index information used to indicate the description information of the data set may be index information of a value of the description information of the data set, and the description information of the data set may be determined by using the index information.

In an implementation, if importance levels of different data sets are different, a data set may be identified by using an importance level information of the data set. It is not difficult to understand that importance levels of data sets to which data in one data tunnel belongs may be different. Therefore, data may be identified by using importance level information of a data set.

In another implementation, importance levels of different data sets may be the same. In this case, a data set cannot be identified by using importance level information of a data set.

In an implementation, importance level information is distinguished by using sequence numbers of different importance levels.

In an implementation, the data tunnel includes a QoS flow.

(1) In an implementation, different types of data frames may be mapped to different data sets, and sequence numbers of the different data sets are different. For example, numbers of a data frame sequence IPBIPPI are I-1, P-1, B-1, I-2, P-2, P-3, I-3.

(2) In another implementation, different types of data frames may be mapped to a same type of data set. For example, a P frame and a B frame may be mapped to a data set of a non-I frame.

Further, in an implementation, sequence numbers of data sets corresponding to different types of data frames mapped to a same type of data set are different. For example, numbers of a data frame sequence IPBIPPI are I-1, non-I-1, non-I-2, I-2, non-I-3, non-I-4, and I-3.

Further, in another implementation, sequence numbers of data sets corresponding to different types of data frames that are mapped to a same type of data set are the same. For example, numbers of a data frame sequence IPBIPPI are 1, 2, 2, 2, 1, 2, 2, 1.

(3) In another implementation, data frames of different types that have an association relationship (for example, a dependent relationship) are mapped to one data set. For example, numbers of a data frame sequence IPBIPPI may be 1, 1, 1, 2, 2, 2, 3.

In some embodiments, the data tunnel association information may include at least one of the following:

description information of a data tunnel on which a data tunnel A is dependent;

description information of a data tunnel that is dependent on the data tunnel A;

description information of data tunnels having an association relationship; or description information of a data tunnel group, where the data tunnel group includes two or more data tunnels having an association relationship.

In an implementation, the data tunnel A may be one of the following: any data tunnel of a terminal, or a data tunnel that carries data of the data set.

In some embodiments, the data set association information may include at least one of the following:

description information of a data set on which a data set A is dependent;

description information of a data set that is dependent on the data set A;

description information of a data set associated with a data set to which the data packet belongs;

description information of data sets having an association relationship; or description information of a data set group, where the data set group includes two or more data sets having an association relationship.

In an implementation, the data tunnel A may be one of the following: any data set, or a data set to which a data packet belongs.

In an implementation, the data set A is used as an example, and a data set associated with the data set A includes at least one of the following: a data set on which the data set A is dependent, or a data set that is dependent on the data set A.

For example, when the data set A is data used for a non-I frame, a data set B may be a data set used for an I frame. In this case, the data set B is a data set that is dependent on the data set A.

For example, when the data set A is data used for an I frame, a data set B may be a data set used for a non-I frame. In this case, the data set B is a data set on which the data set A is dependent.

For example, the data set A is data for a left eye, the data set B is data for a right eye, and there is an association relationship between the data set A and the data set B. That is, a data set associated with the data set A may be the data set B, and vice versa.

In some embodiments, the first operation indication information includes operation information; or the first operation indication information includes operation information, and further includes at least one of the following:

description information of a third data tunnel and/or description information of a fourth data tunnel;

description information of third data and/or description information of fourth data;

description information of a third data set and/or description information of a fourth data set;

description information of a fifth data set;

a first data tunnel group;

a first data set group;

a first time period; or information about a timestamp difference interval, where the first time period can indicate one of the following: executing the operation information within the first time period or an effective time period of the operation information;

the third data is data in the third data tunnel;

the fourth data is data in the fourth data tunnel;

data in the third data set is data in the third data tunnel; and data in the fourth data set is data in the fourth data tunnel.

In some embodiments, the description information of the third data and the description information of the fourth data can be used to indicate that in a case that the third data is lost or fails to be sent, the fourth data is discarded or not sent. Therefore, a case that the fourth data associated with the third data that is lost or fails to be sent cannot be identified can be avoided, thereby improving data operation performance.

And/Or the description information of the third data can be used to indicate that in a case that the third data is lost or fails to be sent, data that meets at least one of the following in the fourth data tunnel is discarded or not sent: other data that is dependent on the third data in a same data set; other data that is associated with the third data in the same data set; other data in the same data set; or other data whose importance level is lower than that of the third data in the same data set, where the same data set is a data set to which the third data belongs. Therefore, a case that the fourth data associated with the third data that is lost or fails to be sent cannot be identified can be avoided, thereby improving data operation performance.

And/Or the description information of the fourth data can be used to indicate that in a case that data that meets a first condition in the third data tunnel is lost or sent, the fourth data is discarded or not sent, where the first condition includes at least one of the following: data on which the fourth data is dependent in a same data set; other data that is associated with the fourth data in the same data set; other data in the same data set; or other data whose importance level is higher than that of the fourth data in the same data set, where the same data set is a data set to which the fourth data belongs. Therefore, a case that the fourth data associated with the third data that is lost or fails to be sent cannot be identified can be avoided, thereby improving data operation performance.

And/Or the description information of the third data set and the description information of the fourth data set can be used to indicate that in a case that the third data set is lost or fails to be sent, data in the fourth data set is discarded or not sent. Therefore, a case that the fourth data associated with the third data that is lost or fails to be sent cannot be identified can be avoided, thereby improving data operation performance.

And/Or the description information of the third data set can be used to indicate that in a case that the third data set is lost or fails to be sent, data that meets at least one of the following in the fourth data tunnel is discarded or not sent: data in a data set that is dependent on the third data set; data in a data set having an association relationship with a first data set; or data in a data set whose importance level is lower than that of the third data set. Therefore, a case that the fourth data associated with the third data that is lost or fails to be sent cannot be identified can be avoided, thereby improving data operation performance.

And/Or the description information of the fourth data set can be used to indicate that in a case that a data set that meets a second condition in the third data tunnel is lost or fails to be sent, data in the fourth data set is discarded or not sent, where the second condition includes at least one of the following: a data set on which the fourth data set is dependent; a data set associated with the fourth data set; or a data set whose importance level is higher than that of the fourth data set. Therefore, a case that the fourth data associated with the third data that is lost or fails to be sent cannot be identified can be avoided, thereby improving data operation performance.

And/Or the description information of the fifth data set can be used to indicate a data set to which the operation information is applicable;

and/or description information of the first data set group can be used to indicate a data set to which the operation information is applicable;

and/or description information of the first data tunnel group can be used to indicate a data tunnel to which the operation information is applicable.

In some embodiments, the operation information may be used to indicate at least one of the following:

discarding or not sending a data packet;

performing a coordinated scheduling operation on data packets;

performing a reordering operation on a data packet; or sending a data packet according to an importance level.

In some embodiments, the foregoing operation of discarding or not sending a data packet includes at least one of the following:

(1) in a case that first data in a first data tunnel is lost or fails to be sent, discarding or not sending data that meets at least one of the following in a second data tunnel; other data that is dependent on the first data in a same data set; other data that is associated with the first data in the same data set; other data in the same data set; or other data whose importance level is lower than that of the first data in the same data set, where the same data set is a data set to which the first data belongs;

(2) in a case that data that meets a fourth condition in the first data tunnel is lost or fails to be sent, discarding or not sending second data in the second data tunnel, where the fourth condition includes at least one of the following: data on which the second data is dependent in a same data set; other data that is associated with the second data in the same data set; other data in the same data set; or other data whose importance level is higher than that of the second data in the same data set, where the same data set is a data set to which the second data belongs;

(3) in a case that a first data set of the first data tunnel is lost or fails to be sent, discarding or not sending data that meets at least one of the following in the second data tunnel; data in a data set that is dependent on the first data set; data in a data set having an association relationship with the first data set; or data in a data set whose importance level is lower than that of the third data set;

(4) in a case that a data set that meets a fifth condition in the first data tunnel is lost or fails to be sent, discarding or not sending data in a second data set of the second data tunnel, where the fifth condition includes at least one of the following: a data set on which the second data set is dependent; a data set associated with the second data set; or a data set whose importance level is higher than that of the second data set;

(5) in a case that the third data is lost or fails to be sent, discarding or not sending the fourth data;

(6) in a case that the third data is lost or fails to be sent, discarding or not sending data that meets at least one of the following: other data that is dependent on the third data in a same data set; other data that is associated with the third data in the same data set; other data in the same data set; or other data whose importance level is lower than that of the third data in the same data set, where the same data set is a data set to which the third data belongs;

(7) in a case that data that meets a sixth condition is lost or fails to be sent, discarding or not sending the fourth data, where the sixth condition includes at least one of the following: data on which the fourth data is dependent in a same data set; other data that is associated with the fourth data in the same data set; other data in the same data set; or other data whose importance level is higher than that of the fourth data in the same data set, where the same data set is a data set to which the fourth data belongs;

(8) in a case that the third data set is lost or fails to be sent, discarding or not sending data in the fourth data set;

(9) in a case that the third data set is lost or fails to be sent, discarding or not sending data that meets at least one of the following: data in another data set that is dependent on the third data set; data in another data set having an association relationship with the first data set; or data in a data set whose importance level is lower than that of the third data set; and

(10) in a case that a data set that meets a seventh condition is lost or fails to be sent, discarding or not sending data in the fourth data set, where the seventh condition includes at least one of the following: a data set on which the fourth data set is dependent; a data set associated with the fourth data set; or a data set whose importance level is higher than that of the fourth data set.

Therefore, through the operation of discarding or not sending in the foregoing (1) to (10), a case that data associated with data that is lost or fails to be sent cannot be identified can be avoided, thereby improving data operation performance.

In an implementation, the first data may be data of a first importance level or a first type, for example, data of an I frame.

In an implementation, the first data may be any data in a data tunnel, or the first data may be any data in a data set.

In an implementation, the left-eye frame and the right-eye frame are mapped to a same data set, the first data may be data of a first type, for example, data of a left-eye frame, and other data that is associated with the first data may be data of a second type, for example, data used for a right-eye frame. In this case, importance levels of the data of the left-eye frame and the data of the right-eye frame may be the same.

In some embodiments, the first data is one of the following: any data in the first data tunnel, data that is in the first data tunnel and that has an association relationship with the second data or data that is in the first data tunnel and that is in a same data set as the second data;

and/or the second data is one of the following: any data in the second data tunnel, data that is in the second data tunnel and that has an association relationship with the first data, or data that is in the second data tunnel and that is in a same data set as the first data;

and/or a data set (that is, a non-third and non-fourth data set) is one of the following: any data set in a data tunnel, the third data set included in the first operation indication information, the fourth data set included in the first operation indication information, or any data set in the first data set group included in the first operation indication information;

and/or the first data set is a data set that meets one of the following in the first data tunnel: any data set, the fifth data set in the first operation indication information, any data set in the first data set group included in the first operation indication information, a data set having an association relationship with the second data set, or the third data set;

and/or the second data set is a data set that meets one of the following in the second data tunnel: any data set, the fifth data set included in the first operation indication information, any data set in the first data set group included in the first operation indication information, a data set having an association relationship with the first data set, or the fourth data set;

and/or the first data tunnel is one of the following: any data tunnel of a terminal, the third data tunnel, or any data tunnel in the first data tunnel group included in the first operation indication information;

and/or the second data tunnel is one of the following: any data tunnel of a terminal, the fourth data tunnel, or any data tunnel in the first data tunnel group included in the first operation indication information.

In some embodiments, the performing a coordinated scheduling operation on data packets may include: performing a coordinated scheduling operation on data packets that meet a third condition, where the third condition includes at least one of the following:

data sets to which the data packets belong are the same;

there is an association relationship between the data sets to which the data packets belong (for example, there is a dependent relationship between the data sets to which the data packets belong);

there is an association relationship between data tunnels to which the data packets belong (for example, there is a dependent relationship between the data tunnels to which the data packet belongs);

timestamps of the data packets are the same or a timestamp difference time is within a timestamp difference interval range;

the data set to which the data packet belongs conforms to a data set indicated by the description information of the fifth data set in the first operation indication information;

the data set to which the data packet belongs conforms to a data set indicated by description information of the first data set group in the first operation indication information; or the data set to which the data packet belongs conforms to a data set indicated by description information of the first data tunnel group in the first operation indication information.

Therefore, the coordinated scheduling operation is performed on the data packets that meet the third condition, so that synchronous scheduling can be performed on data packets that are mapped to different data tunnels, thereby improving data operation performance.

In an implementation, the coordinated scheduling includes: performing coordinated scheduling on a plurality of pieces of data of in a plurality of (greater than or equal to 2) data tunnels or data in a plurality of data sets (for example, a first-type frame and a second-type frame).

In an implementation, data packets on which association scheduling is performed are two or more data packets.

In an implementation, that data sets to which the data packets belong are the same includes sequence numbers of the data sets to which the data packets belong are the same.

In some embodiments, the performing a reordering operation on a data packet includes reordering the data packet according to at least one of the following: a priority of a data tunnel, an importance level of a data set, data set association information, or a timestamp of the data packet. Therefore, the data packet is reordered, so that associated data can be sent in sequence, a case that data cannot be identified is reduced, and data that has a synchronization requirement is scheduled synchronously.

And/Or when the data packet is sent according to the importance level, the importance level includes at least one of the following: an importance level of the data packet, importance of a data set, or a priority of a data tunnel. In this way, it can be ensured that data with a high importance level is sent first, and data with a same importance level is scheduled synchronously.

In some embodiments, the obtaining first information and/or index information used to indicate a value of the first information may include one of the following: receiving, from control plane signaling and/or a first header of a data packet, the first information and/or the index information used to indicate the value of the first information; or obtaining the first information according to a local configuration, where the first header of the data packet is a header of a first protocol.

In an implementation, the first protocol is a GPRS Tunneling Protocol (GTP) or a GPRS Tunneling Protocol user (GTP-U).

In some embodiments, the receiving, from control plane signaling and/or a first header of a data packet, the first information and/or the index information used to indicate the value of the first information includes at least one of the following:

receiving data description information of the data packet from the first header of the data packet, and/or receiving, from the control plane signaling, other content in the first information except the data description information of the data packet;

receiving, from the control plane signaling, the index information used to indicate the value of the first information; or receiving, from the first header of the data packet, the index information used to indicate the value of the first information.

Figure 3:
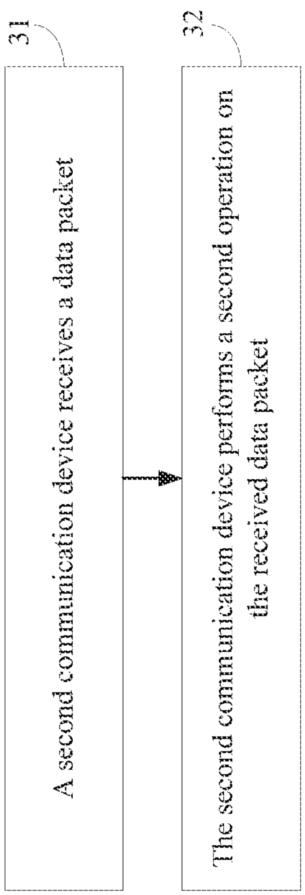
FIG. 3 is a flowchart of another data control method according to an embodiment of this application.

Referring to FIG. 3, FIG. 3 is a flowchart of a data control method according to an embodiment of this application. The method is applied to a second communication device. The second communication device includes but is not limited to a CN network element (for example, a UPF) or UE. As shown in FIG. 3, the method includes the following steps:

Step 31: The second communication device receives a data packet.

Step 32: The second communication device performs a second operation on the received data packet.

In some embodiments, the second operation includes at least one of the following:

performing a data tunnel mapping operation;

identifying whether the data packet is data that conforms to data characteristic information;

adding, to a first header of a data packet that conforms to the data characteristic information, target information that conforms to the data characteristic information;

adding target information corresponding to a default data set to a first header of a data packet that does not conform to the data characteristic information, or adding target information corresponding to a default data set to a first header of data that does not conform to any non-default data set mapping rule; and adding target information corresponding to a default data set to a first header of a data packet that does not conform to data characteristic information in any non-default data set mapping rule, where the target information includes at least one of the following: first information and index information used to indicate a value of the first information.

It can be understood that for the first information and the index information used to indicate the value of the first information, refer to the embodiment in FIG. 3. To avoid repetition, details are not described herein again.

In an implementation, the second communication device receives a data packet from a third communication device, for example, a UPF receives a data packet from an SMF.

In an implementation, first service data may be a data packet of an I frame, a data packet of a left eye, or a data packet of a right eye.

In some embodiments, the identifying data characteristic information of the data packet, and/or identifying that the data packet is a data packet of a first service or is not a data packet of a first service includes:

identifying the data characteristic information of the data packet according to data characteristic information of a header of a second protocol of the data packet and/or data characteristic information in a first operation rule, and/or identifying that the data packet is a data packet of the first service or is not a data packet of the first service. In some embodiments, the first header is a header of a first protocol; and the first protocol includes at least one of the following: the first protocol is an interface protocol between a first communication device and the second communication device.

In an implementation, the second protocol includes at least one of the following: a Real-time Transport Protocol (RTP) protocol and a Moving Picture Experts Group (MPEG) protocol.

In an implementation, the data characteristic information can identify a service type of data, for example, an I frame, a P frame, a B frame, a left-eye frame, and a right-eye frame.

In some embodiments, the performing a data tunnel mapping operation includes at least one of the following:

mapping data that meets at least one of the following to different data tunnels: data in different data sets, data in different types of data sets, data in data sets having different importance levels, different types of data, data having different importance levels, different types of data in a same data set, and data having different importance levels data in a same data set;

mapping data that meets at least one of the following to a same data tunnel: data in a same data set, data in a same type of data set, data in data sets having a same importance level, a same type of data, data having a same importance level, and data in data sets having a same importance level but different types;

mapping an importance level of a data set or an importance level of data to a priority of a data tunnel;

in a case that a data set A is dependent on a data set B and the data set A and the data set B are mapped to different data tunnels, setting a priority of a data tunnel of the data set A to be higher than that of a data tunnel of the data set B; and in a case that data A is dependent on data B and the data A and the data B are mapped to different data tunnels, setting a priority of a data tunnel of the data A to be higher than that of a data tunnel of the data B, where the data A and the data B are in a same data set.

In an implementation, that data in different data sets is mapped to different data tunnels represent that: each data set is mapped to one dedicated data tunnel.

In some embodiments, the performing a second operation includes: obtaining, by the second communication device, a first operation rule, and performing the second operation according to the first operation rule, where the first operation rule includes at least one of the following:

the data characteristic information;

the target information corresponding to the data characteristic information;

operation information used to instruct to add the target information to the first header of the data packet; and a data tunnel mapping rule.

In some embodiments, a data packet in the operation information used to instruct to add the target information to the first header of the data packet is a data packet that conforms to the data description information.

In some embodiments, the data tunnel mapping rule includes at least one of the following: the data characteristic information, description information of a data tunnel, information used to identify the data tunnel mapping rule, a priority of the data tunnel mapping rule, and a data set mapping rule.

In an implementation, that data in different data sets is mapped to different data tunnels represent that: each data set is mapped to one dedicated data tunnel.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and data association information.

In an implementation, the data characteristic information indicates a data tunnel indicated by description information of the data tunnel to which a data packet that conforms to the data characteristic information is mapped.

In an implementation, the second header information includes at least one of the following: RTP header information and MPEG protocol header information.

It is not difficult to understand that in this embodiment, data characteristic information of an obtained data packet is identified, target information is added to a header of a first protocol of the data packet, and/or an operation of mapping a data packet to a data tunnel is performed, so that an association between associated data can be implemented, for example, an importance level of a corresponding data packet is mapped according to an I frame and a non-I frame, and/or timestamp information is added to a data packet. In this way, a subsequent device performs a QoS control operation on a received data packet, thereby improving data operation performance.

Figure 4:
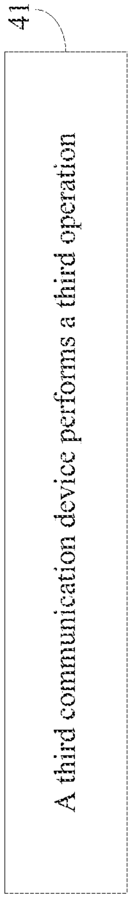
FIG. 4 is a flowchart of another data control method according to an embodiment of this application.

Referring to FIG. 4, FIG. 4 is a flowchart of a data control method according to an embodiment of this application. The method is applied to a third communication device. The third communication device includes but is not limited to a CN network element such as an SMF. As shown in FIG. 4, the method includes the following steps:

Step 41: The third communication device performs a third operation, where the third operation may include at least one of the following:

a data tunnel mapping operation;

determining a first operation rule;

determining an effective time of the first operation rule;

determining first information and/or index information used to indicate a value of the first information;

sending the first operation rule, or sending the first operation rule and the effective time of the first operation rule; and sending the first information and/or the index information used to indicate the value of the first information.

It can be understood that, for the first information, refer to the embodiment in FIG. 3. To avoid repetition, details are not described herein. For the first operation rule, refer to the embodiment in FIG. 4. To avoid repetition, details are not described herein again.

In an implementation, the data tunnel mapping operation is described in the embodiment of the fourth communication device (for example, a PCF), and details are not described herein again.

In an implementation, the first information in the target information is description information of a data set to which the data characteristic information is mapped.

In an implementation, the effective time of the first operation rule may be determined according to information about a time at which a first service occurs.

In an implementation, the third communication device may send the first information to a first communication device, and/or send the first operation rule to a second communication device.

In some embodiments, the performing a third operation includes: obtaining, by the third communication device, third information; and performing the third operation according to the third information, where the third information includes at least one of the following: first policy information, information about an effective time of the first policy information, and fifth information.

The first policy information includes at least one of the following:

the data characteristic information;

the target information corresponding to the data characteristic information;

the first information corresponding to the data characteristic information;

the operation information used to instruct to add the target information to the first header of the data packet; and the data tunnel mapping rule.

The fifth information includes at least one of the following:

data characteristic information of first service data;

information about a time at which a first service occurs; and the first information corresponding to the first service data, where the target information includes at least one of the following: the first information and the index information used to indicate the value of the first information.

In an implementation, the data tunnel mapping operation is described in the embodiment of the fourth communication device (for example, a PCF), and details are not described herein again.

In an implementation, the data tunnel mapping rule is described in the embodiment of the fourth communication device (for example, a PCF), and details are not described herein again.

In an implementation, the first information in the target information is description information of a data set to which the data characteristic information is mapped.

In an implementation, the information about the effective time of the first policy information may be determined according to the information about the time at which the first service occurs.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and data association information.

It is not difficult to understand that in this embodiment, first information is determined and sent, so that a subsequent device can perform a QoS control operation according to the received first information, thereby improving data operation performance; and/or a first operation rule is determined and sent, or a first operation rule and an effective time thereof are determined and sent, so that a subsequent device can implement an association between associated data, for example, an importance level of a corresponding data packet is mapped according to an I frame and a non-I frame, and/or timestamp information is added to a data packet, and a QoS control operation is performed on a data packet, thereby improving data operation performance.

Figure 5:
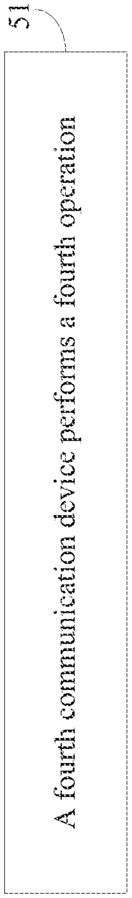
FIG. 5 is a flowchart of another data control method according to an embodiment of this application.

Referring to FIG. 5, FIG. 5 is a flowchart of a data control method according to an embodiment of this application. The method is applied to a fourth communication device. The fourth communication device includes but is not limited to a CN network element such as a PCF. As shown in FIG. 5, the method includes the following steps:

Step 51: The fourth communication device performs a fourth operation.

The fourth operation may include at least one of the following:

performing a data tunnel mapping operation;

determining first policy information;

determining an effective time of the first policy information; and sending the first policy information, or sending the first policy information and information about the effective time of the first policy information, where the first policy information includes at least one of the following:

data characteristic information;

target information corresponding to the data characteristic information;

first information corresponding to the data characteristic information.

operation information used to instruct to add the target information to a first header of a data packet; and a data tunnel mapping rule.

The target information includes at least one of the following: the first information and index information used to indicate a value of the first information.

The first information includes at least one of the following:

data description information of a data packet; data tunnel association information;

data set association information; and first operation indication information.

In an implementation, the fourth communication device sends the first policy information or sends the first policy information and the information about the effective time of the first policy information to a first communication device, a second communication device, or a third communication device.

In an implementation, the fourth communication device sends the first data operation policy to a third communication device.

In an implementation, the information about the effective time of the first policy information may be determined according to information about a time at which a first service occurs.

It can be understood that for the first information and the index information used to indicate the value of the first information, refer to the embodiment in FIG. 3. To avoid repetition, details are not described herein again.

In some embodiments, the data tunnel mapping rule includes at least one of the following: the data characteristic information, description information of a data tunnel, information used to identify the data tunnel mapping rule, a priority of the data tunnel mapping rule, and a data set mapping rule.

In an implementation, a data set mapping rule in the data tunnel mapping rule is a data set mapping rule in the data tunnel.

In an implementation, the data characteristic information indicates a data tunnel indicated by description information of the data tunnel to which a data packet that conforms to the data characteristic information is mapped.

In some embodiments, the performing a data tunnel mapping operation includes at least one of the following:

mapping data that meets at least one of the following to different data tunnels: data in different data sets, data in different types of data sets, data in data sets having different importance levels, different types of data, data having different importance levels, different types of data in a same data set, and data having different importance levels data in a same data set;

mapping data that meets at least one of the following to a same data tunnel: data in a same data set, data in a same type of data set, data in data sets having a same importance level, a same type of data, data having a same importance level, and data in data sets having a same importance level but different types;

mapping an importance level of a data set or an importance level of data to a priority of a data tunnel;

in a case that a data set A is dependent on a data set B and the data set A and the data set B are mapped to different data tunnels, setting a priority of a data tunnel of the data set A to be higher than that of a data tunnel of the data set B; and in a case that data A is dependent on data B and the data A and the data B are mapped to different data tunnels, setting a priority of a data tunnel of the data A to be higher than that of a data tunnel of the data B, where the data A and the data B are in a same data set.

In some embodiments, the determining first policy information may include: obtaining, by the fourth communication device, fifth information, and determining the first policy information according to the fifth information, where the fifth information includes at least one of the following:

data characteristic information of first service data;

information about a time at which a first service occurs; and the first information corresponding to the first service data.

In some embodiments, the fourth operation further includes a related operation of determining the time at which the first service occurs.

In an implementation, the data characteristic information in the first policy information is generated according to the data characteristic information of the first service data.

In an implementation, the information about the effective time of the first policy information or first time period information in the first information is generated according to the information about the time at which the first service occurs.

In an implementation, the data set association information in the first information is generated according to data association information.

In an implementation, the fourth communication device may receive the fifth information from a fifth communication device such as an AF, and may receive the fifth information directly or indirectly receive the fifth information from another forwarding device (for example, an NEF).

In an implementation, a fifth layer of a data packet sent by an XR application is an MPEG protocol, and a protocol header of the MPEG protocol includes information about an I frame. The foregoing information may be used to identify that the data packet is an I-frame data packet of an XR service.

It is not difficult to understand that in this embodiment, a first operation rule is determined and sent, or a first operation rule and an effective time thereof are determined and sent, so that a subsequent device can determine an operation rule of a data packet, to implement an association between associated data, for example, an importance level of a corresponding data packet is mapped according to an I frame and a non-I frame, and/or timestamp information is added to a data packet, and a QoS control operation is performed on a data packet, thereby improving data operation performance.

Figure 6:
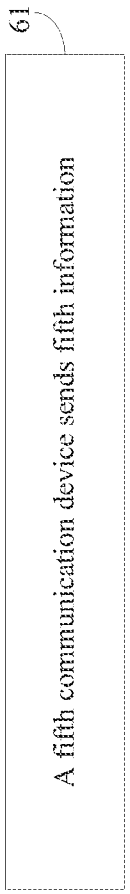
FIG. 6 is a flowchart of another data control method according to an embodiment of this application.

Referring to FIG. 6, FIG. 6 is a flowchart of a data control method according to an embodiment of this application. The method is applied to a fifth communication device. The fifth communication device includes but is not limited to a CN network element such as an AF or UE. As shown in FIG. 6, the method includes the following steps:

Step 61: The fifth communication device sends fifth information.

The fifth information includes at least one of the following:

data characteristic information of first service data;

information about a time at which a first service occurs; and first information corresponding to the first service data, where the first information includes at least one of the following:

data description information of a data packet;

data tunnel association information;

data set association information; and first operation indication information.

It can be understood that, for the first information, refer to the embodiment in FIG. 3. To avoid repetition, details are not described herein again.

In an implementation, the first information corresponding to the first service data includes the first information corresponding to the data characteristic information of the first service data.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and data association information;

and/or the information about the time at which the first service occurs includes at least one of the following: a start time, an end time, and duration.

In an implementation, the data characteristic description may be type information of a data frame, for example, an I frame, a P frame, a B frame, a left-eye frame, and a right-eye frame.

In an implementation, the protocol information to which the data characteristic information belongs may be MPEG protocol information, RTP protocol information, GTP protocol information, and GTP-U protocol information.

In an implementation, the protocol layer information to which the data characteristic information belongs may be an MPEG protocol layer, an RTP protocol layer, a GTP protocol layer, and a GTP-U protocol layer.

In an implementation, the information about the time at which the first service occurs includes a start time of the first service, an end time of the first service, and duration of the first service.

It is not difficult to understand that in this embodiment, fifth information is sent, so that a subsequent device can determine policy information and an operation rule of a data packet, to implement an association between associated data, for example, an importance level of a corresponding data packet is mapped according to an I frame and a non-I frame, and/or timestamp information is added to a data packet, and a QoS control operation is performed on a data packet, thereby improving data operation performance.

Figure 7:
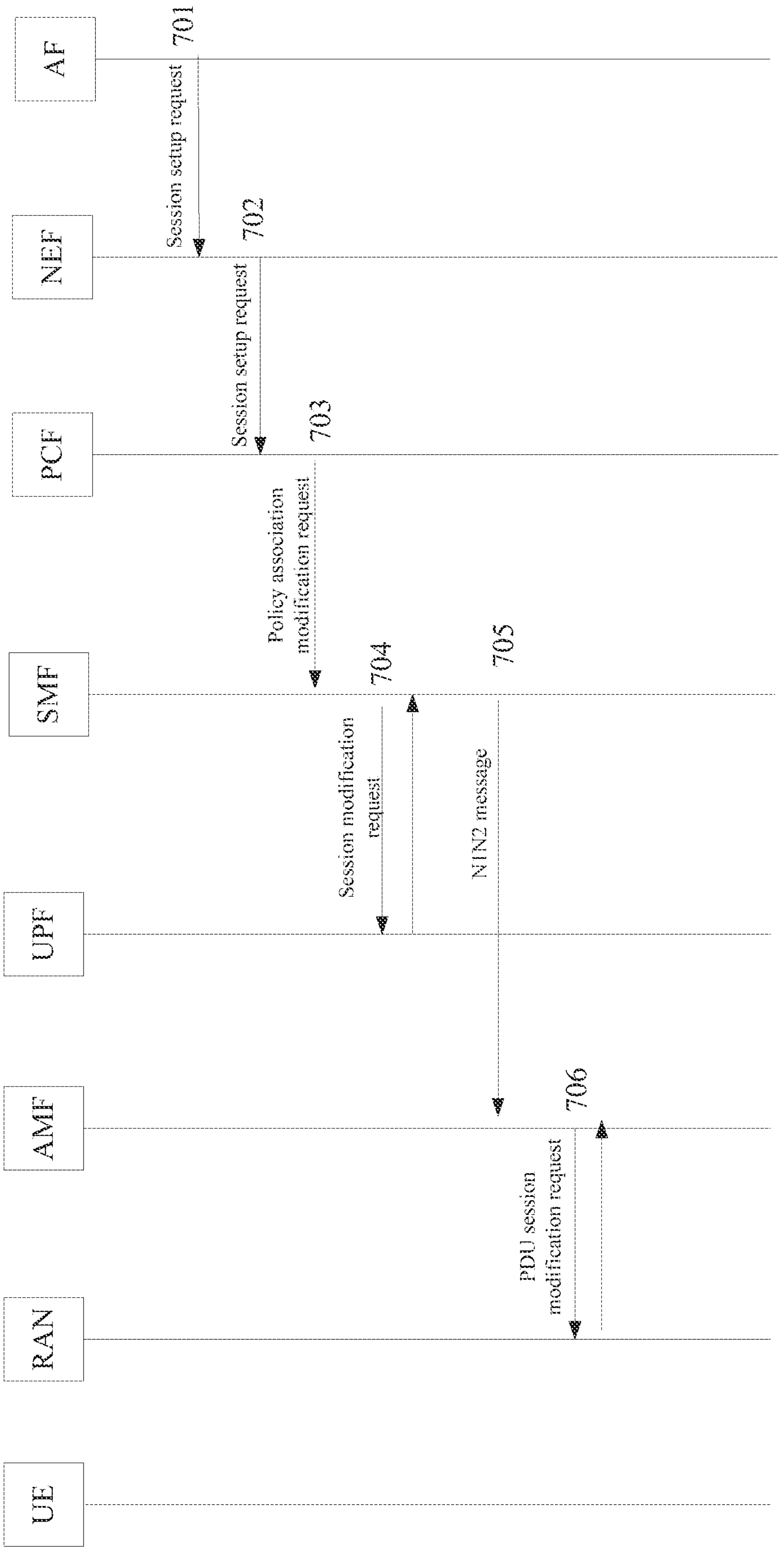
FIG. 7 is a schematic diagram of a data transmission process according to an embodiment of this application.

The following describes a data transmission process in the embodiments of this application with reference to FIG. 7.

As shown in FIG. 7, the data transmission process in the embodiments of this application includes the following steps:

Step 701: An AF sends an AF session setup request to an NEF.

The session setup request may include fifth information, and the fifth information includes at least one of the following:

data characteristic information of first service data;

information about a time at which a first service occurs; and first information corresponding to the first service data.

It can be understood that, for the first information, refer to the embodiment in FIG. 2. To avoid repetition, details are not described herein again.

Step 702: The NEF sends the AF session setup request to a PCF.

Step 703: The PCF sends a policy association modification request to an SMF.

The policy association modification request may include first policy information, or include first policy information and information about an effective time of the first policy information.

The first policy information includes at least one of the following:

data characteristic information;

target information corresponding to the data characteristic information;

first information corresponding to the data characteristic information;

operation information used to instruct to add the target information to a first header of a data packet; and a data tunnel mapping rule.

It can be understood that for the first information, the target information, and the data tunnel mapping rule, refer to the foregoing embodiment. To avoid repetition, details are not described herein again.

Step 704: The SMF sends a session modification request to a UPF.

The session modification request may include a first operation rule, or a first operation rule and an effective time of the first operation rule.

Further, the session modification request may further include:

first information.

Step 705: The SMF sends an N1N2 message to an AMF.

The foregoing N1N2 message may include target information, and the target information may include at least one of the following: first information and index information used to indicate a value of the first information.

Step 706: The AMF sends a PDU session modification request to a RAN.

The PDU session modification request may include at least one of the following: first information and index information used to indicate a value of the first information. For the first information and the index information used to indicate the value of the first information, refer to the embodiment in FIG. 2. To avoid repetition, details are not described herein again.

Further, the RAN may perform a QoS control operation according to the received first information and/or the index information used to indicate the value of the first information, for example, perform discarding or not sending a data packet; performing a coordinated scheduling operation on data packets; performing a reordering operation on a data packet; and sending a data packet according to an importance level. In this way, data operation performance can be improved.

It should be noted that the data control method provided in the embodiments of this application may be performed by a data control apparatus, or a control module that is in the data control apparatus and that is configured to perform the data control method. In the embodiments of this application, an example in which the data control apparatus performs the data control method is used to describe the data control apparatus provided in the embodiments of this application.

Figure 8:
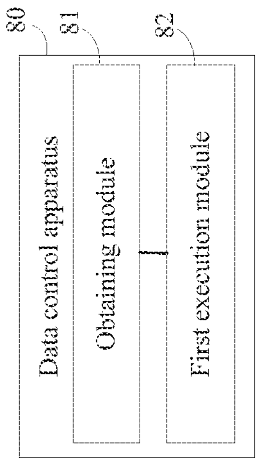
FIG. 8 is a schematic structural diagram of a data control apparatus according to this application.

Referring to FIG. 8, FIG. 8 is a schematic structural diagram of a data control apparatus according to an embodiment of this application. The apparatus is applied to a first communication device. As shown in FIG. 8, a data control apparatus 80 includes:

an obtaining module 81, configured to obtain first information and/or index information used to indicate a value of the first information; and a first execution module 82, configured to perform a QoS control operation according to the first information and/or the index information used to indicate the value of the first information, where the first information includes at least one of the following:

data description information of a data packet;

data tunnel association information;

data set association information; and first operation indication information.

In some embodiments, the data description information of the data packet includes at least one of the following:

description information of a data set to which the data packet belongs and/or index information used to indicate the description information of the data set; and information used to identify the data packet;

type information of the data packet;

an importance level of the data packet; and timestamp information of the data packet.

In some embodiments, the description information of the data set includes at least one of the following:

information used to identify the data set;

importance level information of the data set;

type information of the data set;

label information of the data set; and a sequence number of the data set.

In some embodiments, the information used to identify the data set includes at least one of the following:

the index information used to indicate the description information of the data set;

the importance level information of the data set;

the type information of the data set;

the label information of the data set; and the sequence number of the data set.

In some embodiments, the data tunnel association information includes at least one of the following:

description information of a data tunnel on which a data tunnel A is dependent;

description information of a data tunnel that is dependent on the data tunnel A;

description information of data tunnels having an association relationship; and description information of a data tunnel group, where the data tunnel group includes two or more data tunnels having an association relationship.

In some embodiments, the data set association information includes at least one of the following:

description information of a data set on which a data set A is dependent;

description information of a data set that is dependent on the data set A;

description information of a data set associated with a data set to which the data packet belongs;

description information of data sets having an association relationship; and description information of a data set group, where the data set group includes two or more data sets having an association relationship.

In some embodiments, the first operation indication information includes operation information; or the first operation indication information includes operation information, and further includes at least one of the following:

description information of a third data tunnel and/or description information of a fourth data tunnel;

description information of third data and/or description information of fourth data;

description information of a third data set and/or description information of a fourth data set;

description information of a fifth data set;

a first data tunnel group;

a first data set group;

a first time period; and information about a timestamp difference interval, where the first time period can indicate one of the following: executing the operation information within the first time period and an effective time period of the operation information;

the third data is data in the third data tunnel;

the fourth data is data in the fourth data tunnel;

data in the third data set is data in the third data tunnel; and data in the fourth data set is data in the fourth data tunnel.

In some embodiments, the description information of the third data and the description information of the fourth data can be used to indicate that in a case that the third data is lost or fails to be sent, the fourth data is discarded or not sent; and/or the description information of the third data can be used to indicate that in a case that the third data is lost or fails to be sent, data that meets at least one of the following in the fourth data tunnel is discarded or not sent; other data that is dependent on the third data in a same data set; other data that is associated with the third data in the same data set; other data in the same data set; and other data whose importance level is lower than that of the third data in the same data set, where the same data set is a data set to which the third data belongs; and/or the description information of the fourth data can be used to indicate that in a case that data that meets a first condition in the third data tunnel is lost or sent, the fourth data is discarded or not sent, where the first condition includes at least one of the following: data on which the fourth data is dependent in a same data set; other data that is associated with the fourth data in the same data set; other data in the same data set; and other data whose importance level is higher than that of the fourth data in the same data set, where the same data set is a data set to which the fourth data belongs; and/or the description information of the third data set and the description information of the fourth data set can be used to indicate that in a case that the third data set is lost or fails to be sent, data in the fourth data set is discarded or not sent; and/or the description information of the third data set can be used to indicate that in a case that the third data set is lost or fails to be sent, data that meets at least one of the following in the fourth data tunnel is discarded or not sent; data in a data set that is dependent on the third data set; data in a data set having an association relationship with a first data set; and data in a data set whose importance level is lower than that of the third data set; and/or the description information of the fourth data set can be used to indicate that in a case that a data set that meets a second condition in the third data tunnel is lost or fails to be sent, data in the fourth data set is discarded or not sent, where the second condition includes at least one of the following: a data set on which the fourth data set is dependent; a data set associated with the fourth data set; and a data set whose importance level is higher than that of the fourth data set; and/or the description information of the fifth data set can be used to indicate a data set to which the operation information is applicable; and/or description information of the first data set group can be used to indicate a data set to which the operation information is applicable; and/or description information of the first data tunnel group can be used to indicate a data tunnel to which the operation information is applicable.

In some embodiments, the operation information is used to indicate at least one of the following:

discarding or not sending a data packet;

performing a coordinated scheduling operation on data packets;

performing a reordering operation on a data packet; and sending a data packet according to an importance level.

In some embodiments, the QoS control operation includes at least one of the following:

discarding or not sending a data packet;

performing a coordinated scheduling operation on data packets;

performing a reordering operation on a data packet; and sending a data packet according to an importance level.

In some embodiments, the discarding or not sending a data packet includes at least one of the following:

in a case that first data in a first data tunnel is lost or fails to be sent, discarding or not sending data that meets at least one of the following in a second data tunnel: other data that is dependent on the first data in a same data set; other data that is associated with the first data in the same data set; other data in the same data set; and other data whose importance level is lower than that of the first data in the same data set, where the same data set is a data set to which the first data belongs;

in a case that data that meets a fourth condition in the first data tunnel is lost or fails to be sent, discarding or not sending second data in the second data tunnel, where the fourth condition includes at least one of the following: data on which the second data is dependent in a same data set; other data that is associated with the second data in the same data set; other data in the same data set; and other data whose importance level is higher than that of the second data in the same data set, where the same data set is a data set to which the second data belongs;

in a case that a first data set of the first data tunnel is lost or fails to be sent, discarding or not sending data that meets at least one of the following in the second data tunnel: data in a data set that is dependent on the first data set; data in a data set having an association relationship with the first data set; and data in a data set whose importance level is lower than that of the third data set;

in a case that a data set that meets a fifth condition in the first data tunnel is lost or fails to be sent, discarding or not sending data in a second data set of the second data tunnel, where the fifth condition includes at least one of the following: a data set on which the second data set is dependent; a data set associated with the second data set; and a data set whose importance level is higher than that of the second data set;

in a case that the third data is lost or fails to be sent, discarding or not sending the fourth data;

in a case that the third data is lost or fails to be sent, discarding or not sending data that meets at least one of the following: other data that is dependent on the third data in a same data set; other data that is associated with the third data in the same data set; other data in the same data set; and other data whose importance level is lower than that of the third data in the same data set, where the same data set is a data set to which the third data belongs;

in a case that data that meets a sixth condition is lost or fails to be sent, discarding or not sending the fourth data, where the sixth condition includes at least one of the following: data on which the fourth data is dependent in a same data set; other data that is associated with the fourth data in the same data set; other data in the same data set; and other data whose importance level is higher than that of the fourth data in the same data set, where the same data set is a data set to which the fourth data belongs;

in a case that the third data set is lost or fails to be sent, discarding or not sending data in the fourth data set;

in a case that the third data set is lost or fails to be sent, discarding or not sending data that meets at least one of the following: data in another data set that is dependent on the third data set; data in another data set having an association relationship with the first data set; and data in a data set whose importance level is lower than that of the third data set; and in a case that a data set that meets a seventh condition is lost or fails to be sent, discarding or not sending data in the fourth data set, where the seventh condition includes at least one of the following: a data set on which the fourth data set is dependent; a data set associated with the fourth data set; and a data set whose importance level is higher than that of the fourth data set.

In some embodiments, the first data is one of the following: any data in the first data tunnel, data that is in the first data tunnel and that has an association relationship with the second data, and data that is in the first data tunnel and that is in a same data set as the second data, and/or the second data is one of the following: any data in the second data tunnel, data that is in the second data tunnel and that has an association relationship with the first data, and data that is in the second data tunnel and that is in a same data set as the first data; and/or a data set is one of the following: any data set in a data tunnel, the third data set included in the first operation indication information, the fourth data set included in the first operation indication information, and any data set in the first data set group included in the first operation indication information; and/or the first data set is a data set that meets one of the following in the first data tunnel: any data set, the fifth data set in the first operation indication information, any data set in the first data set group included in the first operation indication information, a data set having an association relationship with the second data set, and the third data set; and/or the second data set is a data set that meets one of the following in the second data tunnel: any data set, the fifth data set included in the first operation indication information, any data set in the first data set group included in the first operation indication information, a data set having an association relationship with the first data set, and the fourth data set; and/or the first data tunnel is one of the following: any data tunnel of a terminal, the third data tunnel, and any data tunnel in the first data tunnel group included in the first operation indication information; and/or the second data tunnel is one of the following: any data tunnel of a terminal, the fourth data tunnel, and any data tunnel in the first data tunnel group included in the first operation indication information.

In some embodiments, the performing a coordinated scheduling operation on data packets includes performing a coordinated scheduling operation on data packets that meet a third condition, where the third condition includes at least one of the following:
data sets to which the data packets belong are the same;

there is an association relationship between the data sets to which the data packets belong;

there is an association relationship between data tunnels to which the data packets belong;

timestamps of the data packets are the same or a timestamp difference time is within a timestamp difference interval range;

the data set to which the data packet belongs conforms to a data set indicated by the description information of the fifth data set in the first operation indication information;

the data set to which the data packet belongs conforms to a data set indicated by description information of the first data set group in the first operation indication information; and the data set to which the data packet belongs conforms to a data set indicated by description information of the first data tunnel group in the first operation indication information.

In some embodiments, the performing a reordering operation on a data packet includes reordering the data packet according to at least one of the following: a priority of a data tunnel, an importance level of a data set, data set association information, and a timestamp of the data packet; and/or when the data packet is sent according to the importance level, the importance level includes at least one of the following: an importance level of the data packet, importance of a data set, and a priority of a data tunnel.

In some embodiments, the obtaining module 81 is configured to perform at least one of the following:

receiving, from control plane signaling and/or a first header of a data packet, the first information and/or the index information used to indicate the value of the first information; and obtaining the first information according to a local configuration, where the first header of the data packet is a header of a first protocol.

In some embodiments, the obtaining module 81 is configured to perform at least one of the following:

receiving data description information of the data packet from the first header of the data packet, and/or receiving, from the control plane signaling, other content in the first information except the data description information of the data packet;

receiving, from the control plane signaling, the index information used to indicate the value of the first information; and receiving, from the first header of the data packet, the index information used to indicate the value of the first information.

In this embodiment of this application, the data control apparatus 80 can implement the processes implemented in the method embodiment shown in FIG. 2 of this application and achieve a same effect. To avoid repetition, details are not described herein again.

Figure 9:
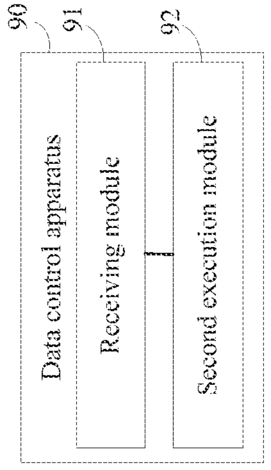
FIG. 9 is a schematic structural diagram of another data control apparatus according to this application.

Referring to FIG. 9, FIG. 9 is a schematic structural diagram of a data control apparatus according to an embodiment of this application. The apparatus is applied to a second communication device. As shown in FIG. 9, a data control apparatus 90 includes:

a receiving module 91, configured to receive a data packet; and a second execution module 92, configured to perform a second operation on the received data packet, where the second operation includes at least one of the following:

performing a data tunnel mapping operation;

identifying whether the data packet is data that conforms to data characteristic information;

adding, to a first header of a data packet that conforms to the data characteristic information, target information that conforms to the data characteristic information;

adding target information corresponding to a default data set to a first header of a data packet that does not conform to the data characteristic information; and adding target information corresponding to a default data set to a first header of a data packet that does not conform to data characteristic information in any non-default data set mapping rule, where the target information includes at least one of the following: first information and index information used to indicate a value of the first information; and the first information includes at least one of the following:

data description information of a data packet;

data tunnel association information;

data set association information; and first operation indication information.

In some embodiments, the identifying whether the data packet is data that conforms to data characteristic information includes:

identifying, according to header information of a second protocol of the data packet, whether the data packet is data that conforms to the data characteristic information.

In some embodiments, the first header is a header of a first protocol; and the first protocol includes at least one of the following: the first protocol is an interface protocol between a first communication device and the second communication device.

In some embodiments, the performing a data tunnel mapping operation includes at least one of the following:

mapping data that meets at least one of the following to different data tunnels: data in different data sets, data in different types of data sets, data in data sets having different importance levels, different types of data, data having different importance levels, different types of data in a same data set, and data having different importance levels data in a same data set;

mapping data that meets at least one of the following to a same data tunnel: data in a same data set, data in a same type of data set, data in data sets having a same importance level, a same type of data, data having a same importance level, and data in data sets having a same importance level but different types;

mapping an importance level of a data set or an importance level of data to a priority of a data tunnel;

in a case that a data set A is dependent on a data set B and the data set A and the data set B are mapped to different data tunnels, setting a priority of a data tunnel of the data set A to be higher than that of a data tunnel of the data set B; and in a case that data A is dependent on data B and the data A and the data B are mapped to different data tunnels, setting a priority of a data tunnel of the data A to be higher than that of a data tunnel of the data B, where the data A and the data B are in a same data set.

In some embodiments, the second execution module 92 is further configured to: obtain a first operation rule; and perform the second operation according to the first operation rule, where the first operation rule includes at least one of the following:

the data characteristic information;

the target information corresponding to the data characteristic information;

operation information used to instruct to add the target information to the first header of the data packet; and a data tunnel mapping rule.

In some embodiments, the data tunnel mapping rule includes at least one of the following: the data characteristic information, description information of a data tunnel, information used to identify the data tunnel mapping rule, a priority of the data tunnel mapping rule, and a data set mapping rule.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and data association information.

In this embodiment of this application, the data control apparatus 90 can implement the processes implemented in the method embodiment shown in FIG. 3 of this application and achieve a same effect. To avoid repetition, details are not described herein again.

Figure 10:
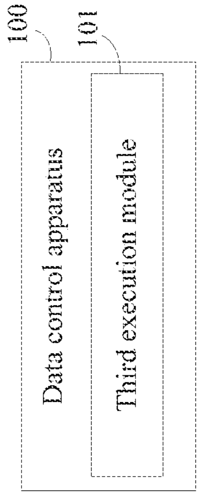
FIG. 10 is a schematic structural diagram of another data control apparatus according to this application.

Referring to FIG. 10, FIG. 10 is a schematic structural diagram of a data control apparatus according to an embodiment of this application. The apparatus is applied to a second communication device. As shown in FIG. 10, a data control apparatus 100 includes:

a third execution module 101, configured to perform a third operation, where the third operation includes at least one of the following:

a data tunnel mapping operation;

determining a first operation rule;

determining an effective time of the first operation rule;

determining first information and/or index information used to indicate a value of the first information;

sending the first operation rule, or sending the first operation rule and the effective time of the first operation rule; and sending the first information and/or the index information used to indicate the value of the first information, where the first information includes at least one of the following:

data description information of a data packet;

data tunnel association information;

data set association information; and first operation indication information; and the first operation rule includes at least one of the following:

data characteristic information;

target information corresponding to the data characteristic information;

operation information used to instruct to add the target information to a first header of a data packet; and a data tunnel mapping rule, where the target information includes at least one of the following: the first information and the index information used to indicate the value of the first information.

In some embodiments, the third execution module 101 is further configured to: obtain third information; and perform a third operation according to the third information, where the third information includes at least one of the following: first policy information, information about an effective time of the first policy information, and fifth information, where the first policy information includes at least one of the following:

the data characteristic information;

the target information corresponding to the data characteristic information;

the first information corresponding to the data characteristic information;

the operation information used to instruct to add the target information to the first header of the data packet; and the data tunnel mapping rule; and the fifth information includes at least one of the following:

data characteristic information of first service data;

information about a time at which a first service occurs; and the first information corresponding to the first service data, where the target information includes at least one of the following: the first information and the index information used to indicate the value of the first information.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and data association information.

In this embodiment of this application, the data control apparatus 100 can implement the processes implemented in the method embodiment shown in FIG. 4 of this application and achieve a same effect. To avoid repetition, details are not described herein again.

Figure 11:
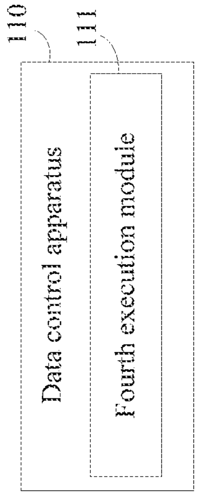
FIG. 11 is a schematic structural diagram of another data control apparatus according to this application.

Referring to FIG. 11, FIG. 11 is a schematic structural diagram of a data control apparatus according to an embodiment of this application. The apparatus is applied to a second communication device. As shown in FIG. 11, a data control apparatus 110 includes:

a fourth execution module 111, configured to perform a fourth operation, where the fourth operation includes at least one of the following:

performing a data tunnel mapping operation;

determining first policy information;

determining an effective time of the first policy information; and sending the first policy information, or sending the first policy information and information about the effective time of the first policy information, where the first policy information includes at least one of the following:

data characteristic information;

target information corresponding to the data characteristic information;

first information corresponding to the data characteristic information;

operation information used to instruct to add the target information to a first header of a data packet; and a data tunnel mapping rule, where the target information includes at least one of the following: the first information and index information used to indicate a value of the first information; and the first information includes at least one of the following:

data description information of a data packet;

data tunnel association information;

data set association information; and first operation indication information.

In some embodiments, the data tunnel mapping rule includes at least one of the following: the data characteristic information, description information of a data tunnel, information used to identify the data tunnel mapping rule, a priority of the data tunnel mapping rule, and a data set mapping rule.

In some embodiments, the performing a data tunnel mapping operation includes at least one of the following:

mapping data that meets at least one of the following to different data tunnels: data in different data sets, data in different types of data sets, data in data sets having different importance levels, different types of data, data having different importance levels, different types of data in a same data set, and data having different importance levels data in a same data set;

mapping data that meets at least one of the following to a same data tunnel: data in a same data set, data in a same type of data set, data in data sets having a same importance level, a same type of data, data having a same importance level, and data in data sets having a same importance level but different types;

mapping an importance level of a data set or an importance level of data to a priority of a data tunnel;

in a case that a data set A is dependent on a data set B and the data set A and the data set B are mapped to different data tunnels, setting a priority of a data tunnel of the data set A to be higher than that of a data tunnel of the data set B; and in a case that data A is dependent on data B and the data A and the data B are mapped to different data tunnels, setting a priority of a data tunnel of the data A to be higher than that of a data tunnel of the data B, where the data A and the data B are in a same data set.

In some embodiments, for the determining first policy information, the fourth execution module 111 is further configured to: obtain fifth information; and determine the first policy information according to the fifth information, where the fifth information includes at least one of the following:
data characteristic information of first service data;
information about a time at which a first service occurs; and
the first information corresponding to the first service data.

In this embodiment of this application, the data control apparatus 110 can implement the processes implemented in the method embodiment shown in FIG. 5 of this application and achieve a same effect. To avoid repetition, details are not described herein again.

Figure 12:
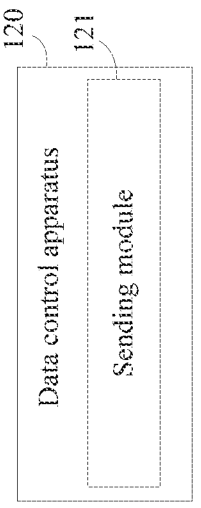
FIG. 12 is a schematic structural diagram of another data control apparatus according to this application.

Referring to FIG. 12, FIG. 12 is a schematic structural diagram of a data control apparatus according to an embodiment of this application. The apparatus is applied to a second communication device. As shown in FIG. 12, a data control apparatus 120 includes:

a sending module 121, configured to send fifth information, where
the fifth information includes at least one of the following:
data characteristic information of first service data;
information about a time at which a first service occurs; and
first information corresponding to the first service data, where
the first information includes at least one of the following:
data description information of a data packet;
data tunnel association information;
data set association information; and
first operation indication information.

In some embodiments, the data characteristic information includes at least one of the following: description information of a service, a data characteristic description, second header information corresponding to the data characteristic information, protocol information to which the data characteristic information belongs, protocol layer information to which the data characteristic information belongs, and data association information;

the information about the time at which the first service occurs includes at least one of the following: a start time, an end time, and duration.

In this embodiment of this application, the data control apparatus 120 can implement the processes implemented in the method embodiment shown in FIG. 6 of this application and achieve a same effect. To avoid repetition, details are not described herein again.

Figure 13:
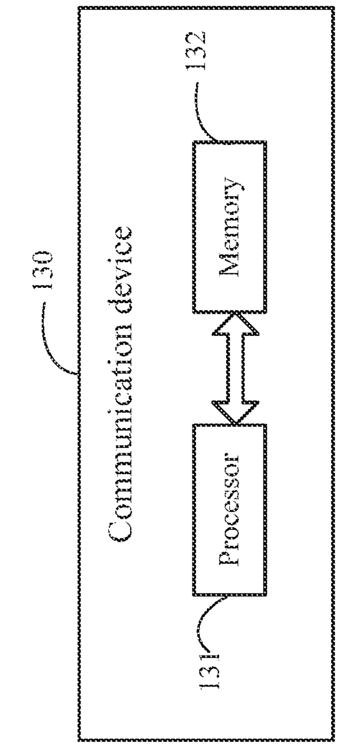
FIG. 13 is a schematic structural diagram of a communication device according to this application.

As shown in FIG. 13, an embodiment of this application further provides a communication device 130, including a processor 131, a memory 132, a program or an instruction that is stored in the memory 132 and can be run on the processor 131, where the program or the instruction is executed by the processor 131 to implement the processes of the foregoing data control method embodiment, and a same technical effect can be achieved. To avoid repetition, details are not described herein again.

An embodiment of this application further provides a readable storage medium. The readable storage medium stores a program or an instruction, and the program or the instruction is executed by a processor to implement the processes of the foregoing data control method embodiment, and a same technical effect can be achieved. To avoid repetition, details are not described herein again.

The processor is a processor in the terminal in the foregoing embodiment. The readable storage medium includes a computer-readable storage medium, such as a computer Read-only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing data control method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by “includes a . . . ” does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (for example, a ROM/RAM, a hard disk, or an optical disc), and includes several instructions for instructing a terminal (which may be a mobile phone, a computer, a server, an air conditioner, a network side device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for data control, comprising:

obtaining, by a first communication device, first information or index information used to indicate a value of the first information; and performing, by the first communication device, a quality of service (QoS) control operation according to the first information or the index information used to indicate the value of the first information, wherein the first information comprises:

data tunnel association information, wherein the QoS control operation comprises:

performing a coordinated scheduling operation on data packets in data tunnels having an association relationship, wherein in the coordinated scheduling operation, synchronous scheduling is performed on the data packets that are mapped to different data tunnels.

2. The method according to claim 1, wherein the first information further comprises data description information of a data packet, wherein the data description information of the data packet comprises at least one of the following:

description information of a data set to which the data packet belongs or index information used to indicate the description information of the data set; and information used to identify the data packet;

type information of the data packet;

an importance level of the data packet; or timestamp information of the data packet.

3. The method according to claim 2, wherein the description information of the data set comprises at least one of the following:

information used to identify the data set;

importance level information of the data set;

type information of the data set;

label information of the data set; or a sequence number of the data set.

4. The method according to claim 1, wherein the data tunnel association information comprises at least one of the following:

description information of a data tunnel on which a data tunnel A is dependent;

description information of a data tunnel that is dependent on the data tunnel A;

description information of data tunnels having an association relationship; or description information of a data tunnel group, wherein the data tunnel group comprises two or more of the data tunnels having the association relationship.

5. The method according to claim 1, wherein the first information further comprises data set association information, wherein the data set association information comprises at least one of the following:

description information of a data set on which a data set A is dependent;

description information of a data set that is dependent on the data set A;

description information of a data set associated with a data set to which the data packet belongs;

description information of data sets having an association relationship; or description information of a data set group, wherein the data set group comprises two or more data sets having an association relationship.

6. The method according to claim 1, wherein the first information further comprises first operation indication information, wherein the first operation indication information comprises operation information; or the first operation indication information comprises operation information, and further comprises at least one of the following:

description information of a third data tunnel or description information of a fourth data tunnel;

description information of third data or description information of fourth data;

description information of a third data set or description information of a fourth data set;

description information of a fifth data set;

a first data tunnel group;

a first data set group;

a first time period; or information about a timestamp difference interval, wherein the first time period indicates one of the following: executing the operation information within the first time period and an effective time period of the operation information;

the third data is data in the third data tunnel;

the fourth data is data in the fourth data tunnel;

data in the third data set is data in the third data tunnel; or data in the fourth data set is data in the fourth data tunnel, wherein the operation information is used to indicate at least one of the following:

discarding or not sending a data packet;

performing a coordinated scheduling operation on data packets;

performing a reordering operation on a data packet; or sending a data packet according to an importance level.

7. The method according to claim 6, wherein the description information of the third data and the description information of the fourth data are used to indicate when the third data is lost or fails to be sent, the fourth data is discarded or not sent; or the description information of the third data is used to indicate when the third data is lost or fails to be sent, data that meets at least one of the following in the fourth data tunnel is discarded or not sent: other data that is dependent on the third data in a same data set; other data that is associated with the third data in the same data set; other data in the same data set; or other data whose importance level is lower than that of the third data in the same data set, wherein the same data set is a data set to which the third data belongs; or the description information of the fourth data is used to indicate when data that meets a first condition in the third data tunnel is lost or sent, the fourth data is discarded or not sent, wherein the first condition comprises at least one of the following: data on which the fourth data is dependent in a same data set; other data that is associated with the fourth data in the same data set; other data in the same data set; or other data whose importance level is higher than that of the fourth data in the same data set, wherein the same data set is a data set to which the fourth data belongs; or the description information of the third data set and the description information of the fourth data set are used to indicate when the third data set is lost or fails to be sent, data in the fourth data set is discarded or not sent; or the description information of the third data set is used to indicate when the third data set is lost or fails to be sent, data that meets at least one of the following in the fourth data tunnel is discarded or not sent: data in a data set that is dependent on the third data set; data in a data set having an association relationship with a first data set; or data in a data set whose importance level is lower than that of the third data set; or the description information of the fourth data set is used to indicate when a data set that meets a second condition in the third data tunnel is lost or fails to be sent, data in the fourth data set is discarded or not sent, wherein the second condition comprises at least one of the following: a data set on which the fourth data set is dependent; a data set associated with the fourth data set; or a data set whose importance level is higher than that of the fourth data set; or the description information of the fifth data set is used to indicate a data set to which the operation information is applicable; or description information of the first data set group is used to indicate a data set to which the operation information is applicable; or description information of the first data tunnel group is used to indicate a data tunnel to which the operation information is applicable.

8. The method according to claim 1, wherein the QoS control operation further comprises at least one of the following:

discarding or not sending a data packet;

performing a reordering operation on a data packet; or sending a data packet according to an importance level.

9. The method according to claim 7, wherein the discarding or not sending a data packet comprises at least one of the following:

when first data in a first data tunnel is lost or fails to be sent, discarding or not sending data that meets at least one of the following in a second data tunnel: other data that is dependent on the first data in a same data set; other data that is associated with the first data in the same data set; other data in the same data set; or other data whose importance level is lower than that of the first data in the same data set, wherein the same data set is a data set to which the first data belongs;

when data that meets a fourth condition in the first data tunnel is lost or fails to be sent, discarding or not sending second data in the second data tunnel, wherein the data meeting the fourth condition comprises at least one of the following: data on which the second data is dependent in a same data set; other data that is associated with the second data in the same data set; other data in the same data set; or other data whose importance level is higher than that of the second data in the same data set, wherein the same data set is a data set to which the second data belongs;

when a first data set of the first data tunnel is lost or fails to be sent, discarding or not sending data that meets at least one of the following in the second data tunnel: data in a data set that is dependent on the first data set; data in a data set having an association relationship with the first data set; or data in a data set whose importance level is lower than that of the third data set;

when a data set that meets a fifth condition in the first data tunnel is lost or fails to be sent, discarding or not sending data in a second data set of the second data tunnel, wherein the data set meeting the fifth condition comprises at least one of the following: a data set on which the second data set is dependent; a data set associated with the second data set; or a data set whose importance level is higher than that of the second data set;

when the third data is lost or fails to be sent, discarding or not sending the fourth data;

when the third data is lost or fails to be sent, discarding or not sending data that meets at least one of the following: other data that is dependent on the third data in a same data set; other data that is associated with the third data in the same data set; other data in the same data set; or other data whose importance level is lower than that of the third data in the same data set, wherein the same data set is a data set to which the third data belongs;

when data that meets a sixth condition is lost or fails to be sent, discarding or not sending the fourth data, wherein the data meeting the sixth condition comprises at least one of the following: data on which the fourth data is dependent in a same data set; other data that is associated with the fourth data in the same data set; other data in the same data set; or other data whose importance level is higher than that of the fourth data in the same data set, wherein the same data set is a data set to which the fourth data belongs;

when the third data set is lost or fails to be sent, discarding or not sending data in the fourth data set;

when the third data set is lost or fails to be sent, discarding or not sending data that meets at least one of the following: data in another data set that is dependent on the third data set; data in another data set having an association relationship with the first data set; or data in a data set whose importance level is lower than that of the third data set; or when a data set that meets a seventh condition is lost or fails to be sent, discarding or not sending data in the fourth data set, wherein the data set meeting the seventh condition comprises at least one of the following: a data set on which the fourth data set is dependent; a data set associated with the fourth data set; or a data set whose importance level is higher than that of the fourth data set.

10. The method according to claim 9, wherein the first data is one of the following: any data in the first data tunnel, data that is in the first data tunnel and that has an association relationship with the second data, or data that is in the first data tunnel and that is in a same data set as the second data; or the second data is one of the following: any data in the second data tunnel, data that is in the second data tunnel and that has an association relationship with the first data, or data that is in the second data tunnel and that is in a same data set as the first data; or a data set is one of the following: any data set in a data tunnel, the third data set comprised in the first operation indication information, the fourth data set comprised in the first operation indication information, or any data set in the first data set group comprised in the first operation indication information; or the first data set is a data set that meets one of the following in the first data tunnel: any data set, the fifth data set in the first operation indication information, any data set in the first data set group comprised in the first operation indication information, a data set having an association relationship with the second data set, or the third data set; or the second data set is a data set that meets one of the following in the second data tunnel: any data set, the fifth data set comprised in the first operation indication information, any data set in the first data set group comprised in the first operation indication information, a data set having an association relationship with the first data set, or the fourth data set; or the first data tunnel is one of the following: any data tunnel of a terminal, the third data tunnel, or any data tunnel in the first data tunnel group comprised in the first operation indication information; or the second data tunnel is one of the following: any data tunnel of a terminal, the fourth data tunnel, or any data tunnel in the first data tunnel group comprised in the first operation indication information.

11. The method according to claim 7, wherein the performing a coordinated scheduling operation on data packets comprises performing a coordinated scheduling operation on data packets that meet a third condition, wherein the third condition comprises at least one of the following:

data sets to which the data packets belong are the same;

there is an association relationship between the data sets to which the data packets belong;

there is an association relationship between data tunnels to which the data packets belong;

timestamps of the data packets are the same or a timestamp difference time is within a timestamp difference interval range;

the data set to which the data packet belongs conforms to a data set indicated by the description information of the fifth data set in the first operation indication information;

the data set to which the data packet belongs conforms to a data set indicated by description information of the first data set group in the first operation indication information; or the data set to which the data packet belongs conforms to a data set indicated by description information of the first data tunnel group in the first operation indication information.

12. The method according to claim 7, wherein the performing a reordering operation on a data packet comprises reordering the data packet according to at least one of the following: a priority of a data tunnel, an importance level of a data set, data set association information, or a timestamp of the data packet; or when the data packet is sent according to the importance level, the importance level comprises at least one of the following: an importance level of the data packet, importance of a data set, or a priority of a data tunnel.

13. The method according to claim 1, wherein the obtaining first information or index information used to indicate a value of the first information comprises at least one of the following:

receiving, from control plane signaling or a first header of a data packet, the first information or the index information used to indicate the value of the first information; and obtaining the first information according to a local configuration, wherein the first header of the data packet is a header of a first protocol.

14. The method according to claim 13, wherein the receiving, from control plane signaling or a first header of a data packet, the first information or the index information used to indicate the value of the first information comprises at least one of the following:

receiving data description information of the data packet from the first header of the data packet, or receiving, from the control plane signaling, other content in the first information except the data description information of the data packet;

receiving, from the control plane signaling, the index information used to indicate the value of the first information; or receiving, from the first header of the data packet, the index information used to indicate the value of the first information.

15. A method for data control, comprising:

receiving, by a second communication device, a data packet; and performing, by the second communication device, a second operation on the received data packet, wherein the second operation comprises at least one of the following:

adding target information corresponding to a default data set to a first header of a data packet that does not conform to data characteristic information, or adding target information corresponding to a default data set to a first header of data that does not conform to any non-default data set mapping rule; or adding target information corresponding to a default data set to a first header of a data packet that does not conform to data characteristic information in any non-default data set mapping rule, wherein the target information comprises at least one of the following: first information or index information used to indicate a value of the first information; and the first information comprises at least one of the following:

data description information of a data packet;

data tunnel association information;

data set association information; or first operation indication information.

16. The method according to claim 15, wherein the second operation further comprises identifying whether the data packet is data that conforms to data characteristic information:

wherein the identifying whether the data packet is data that conforms to data characteristic information comprises:

identifying, according to header information of a second protocol of the data packet, whether the data packet is data that conforms to the data characteristic information.

17. The method according to claim 15, wherein the second operation further comprises performing a data tunnel mapping operation, wherein the performing the data tunnel mapping operation comprises at least one of the following:

mapping data that meets at least one of the following to different data tunnels: data in different data sets, data in different types of data sets, data in data sets having different importance levels, different types of data, data having different importance levels, different types of data in a same data set, or data having different importance levels data in a same data set;

mapping data that meets at least one of the following to a same data tunnel: data in a same data set, data in a same type of data set, data in data sets having a same importance level, a same type of data, data having a same importance level, or data in data sets having a same importance level but different types;

mapping an importance level of a data set or an importance level of data to a priority of a data tunnel;

when a data set A is dependent on a data set B and the data set A and the data set B are mapped to different data tunnels, setting a priority of a data tunnel of the data set A to be higher than that of a data tunnel of the data set B; or when data A is dependent on data B and the data A and the data B are mapped to different data tunnels, setting a priority of a data tunnel of the data A to be higher than that of a data tunnel of the data B, wherein the data A and the data B are in a same data set.

18. The method according to claim 15, wherein the performing a second operation comprises:

obtaining, by the second communication device, a first operation rule; and performing, by the second communication device, the second operation according to the first operation rule, wherein the first operation rule comprises at least one of the following:

the data characteristic information;

the target information corresponding to the data characteristic information;

operation information used to instruct to add the target information to the first header of the data packet; or a data tunnel mapping rule.

19. The method according to claim 15, wherein the data characteristic information comprises at least one of the following: description information of a service, a data characteristic description, second header information corresponding to the data characteristic information, protocol information to which the data characteristic information belongs, protocol layer information to which the data characteristic information belongs, or data association information.

20. An electronic device, comprising: a memory storing a computer program; and a processor coupled to the memory and configured to execute the computer program to perform operations comprising:

obtaining first information or index information used to indicate a value of the first information; and performing a quality of service (QoS) control operation according to the first information or the index information used to indicate the value of the first information, wherein the first information comprises:

data tunnel association information, wherein the QoS control operation comprises:

performing a coordinated scheduling operation on data packets in data tunnels having an association relationship, wherein in the coordinated scheduling operation, synchronous scheduling is performed on the data packets that are mapped to different data tunnels.

* * * * *